(12) United States Patent
Tokuchi

(10) Patent No.: US 11,325,035 B2
(45) Date of Patent: May 10, 2022

(54) LOCATION-BASED GAME SWITCHING TO INPUT INTERFACE MOVEMENT MAP

(71) Applicant: FUJIFILM Business Innovation Corp., Tokyo (JP)

(72) Inventor: Kengo Tokuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/822,506

(22) Filed: Mar. 18, 2020

(65) Prior Publication Data

US 2020/0215435 A1 Jul. 9, 2020

Related U.S. Application Data

(63) Continuation of application No. 15/699,344, filed on Sep. 8, 2017, now Pat. No. 10,603,588.

(30) Foreign Application Priority Data

Feb. 16, 2017 (JP) .................................. 2017-027286

(51) Int. Cl.
- *A63F 13/216* (2014.01)
- *A63F 13/52* (2014.01)
- *A63F 13/46* (2014.01)
- *A63F 13/79* (2014.01)
- *A63F 13/5378* (2014.01)
- *A63F 13/35* (2014.01)

(52) U.S. Cl.
CPC ............ *A63F 13/52* (2014.09); *A63F 13/216* (2014.09); *A63F 13/46* (2014.09); *A63F 13/5378* (2014.09); *A63F 13/79* (2014.09); *A63F 13/35* (2014.09)

(58) Field of Classification Search
None
See application file for complete search history.

(56) References Cited

U.S. PATENT DOCUMENTS

| | | |
|---|---|---|
| 8,287,383 B1 | 10/2012 | Etter |
| 8,827,808 B2 | 9/2014 | Matsumaru et al. |
| 2002/0140696 A1 | 10/2002 | Futamura et al. |
| 2004/0259613 A1 | 12/2004 | Machida |
| 2007/0197289 A1 | 8/2007 | Fujimoto et al. |

(Continued)

FOREIGN PATENT DOCUMENTS

| | | |
|---|---|---|
| EP | 1 089 223 A2 | 4/2001 |
| JP | 2001-101120 A | 4/2001 |

(Continued)

OTHER PUBLICATIONS

"Final Fantasy XIV A Realm Reborn Combat Basics", Mar. 25, 2015, YouTube video, https://www.youtube.com/watch?v=MyB8NGnE4RY (Year: 2015).*

"Pokemon go our first gym battle", Jun. 27, 2016, YouTube video, https://www.youtube.com/watch?v=7x0fmmhViuo (Year: 2016).*

(Continued)

*Primary Examiner* — Damon J Pierce
(74) *Attorney, Agent, or Firm* — Sughrue Mion, PLLC

(57) ABSTRACT

An information processing device includes a controller that moves and controls a display of a character image in a virtual space, in accordance with a movement of a user in a real space, and an awarding unit that awards points to the user in a case in which the character image is made to overlap, in the virtual space, an other character image of an other user.

20 Claims, 14 Drawing Sheets

(56) References Cited

U.S. PATENT DOCUMENTS

| | | | |
|---|---|---|---|
| 2007/0218987 A1 | 9/2007 | Van Luchene | |
| 2007/0225071 A1 | 9/2007 | Van Luchene | |
| 2009/0221368 A1 | 9/2009 | Yen et al. | |
| 2012/0157210 A1 | 6/2012 | Hall | |
| 2012/0315986 A1 | 12/2012 | Walling | |
| 2016/0121215 A1 | 5/2016 | Fukazawa et al. | |
| 2016/0325183 A1 | 11/2016 | Chowdhary | |
| 2018/0345147 A1* | 12/2018 | Okajima | G06T 19/20 |

FOREIGN PATENT DOCUMENTS

| | | | |
|---|---|---|---|
| JP | 2002102542 A | 4/2002 | |
| JP | 2002200350 A | 7/2002 | |
| JP | 2002282553 A | 10/2002 | |
| JP | 2002298159 A | 10/2002 | |
| JP | 2004064398 A | 2/2004 | |
| JP | 2005169138 A | 6/2005 | |
| JP | 2006004324 A | 1/2006 | |
| JP | 2006130348 A | 5/2006 | |
| JP | 2007222214 A | 9/2007 | |
| JP | 2009093478 A | 4/2009 | |
| JP | 2009-536067 A | 10/2009 | |
| JP | 2010076840 A | 4/2010 | |
| JP | 2010240474 A | 10/2010 | |
| JP | 2010-257461 A | 11/2010 | |
| JP | 2011024612 A | 2/2011 | |
| JP | 2013-94437 A | 5/2013 | |
| JP | 2014-23720 A | 2/2014 | |
| JP | 2014523767 A | 9/2014 | |
| JP | 2014221404 A | 11/2014 | |
| JP | 2015008836 A | 1/2015 | |
| JP | 2015-173929 A | 10/2015 | |
| JP | 2016086970 A | 5/2016 | |
| JP | 6075489 B1 | 2/2017 | |

OTHER PUBLICATIONS

"Final Fantasy XIV: Heavensward—How to Fly !!", Jun. 23, 2015, YouTube video, https://www.youtube.com/watch?v=tAYNqgaa6mQ (Year: 2015).*

"Pokemon GO: Everything You Need To Know About Gyms, Training and Battling", Hayley Williams, Jul. 12, 2016, Kotaku, https://www.kotaku.com.au/2016/07/pokemon-go-everything-you-need-to-know-about-gyms-training-and-battling/ (Year: 2016).*

Final Fantasy XIV in Wikipedia using Internet Archive Wayback Machine, Jan. 29, 2017, https://web.archive.org/web/20170129082736/https://en.wikipedia.org/wiki/Final_Fantasy_XIV (Year: 2017).*

Pokemon Go in Wikipedia using Internet Archive Wayback Machine, Feb. 2, 2017, https://web.archive.org/web/20170202003412/https://en.wikipedia.org/wiki/Pok%C3%A9mon_Go (Year: 2017).*

Notice of Reasons for Refusal dated Mar. 9, 2021 from the Japanese Patent Office in JP Application No. 2020-039340.

Andronavi, "Real-time Battle that can be conjointly held by Dr. RPN! which is a member by fighting a monster on the map", Jan. 24, 2016 [Retrieved on Jun. 14, 2019] URL <htpps://andronavi.com/2017/01/3779549/> (total 11 pages).

YouTube, "Famikon Jump de asobi masu Sono 1", [Internet] Oct. 22, 2015, Retrieved on Jun. 14, 2019, URL <http://www.youtube.com/watch?v=Sgyr0t6JW1g> Time 6:40 to 6:59, Screen shot (total 2 pages).

Communication dated May 28, 2019 from Japanese Patent Office in counterpart JP Application No. 2018-093852.

Communication dated Mar. 20, 2018, from the Japanese Patent Office in counterpart application No. 2017-027286.

Communication dated Jul. 17, 2018 from the Japanese Patent Office in counterpart Japanese application No. 2017-027286.

Communication dated Sep. 14, 2021, from the Japanese Patent office in application No. 2020-039340.

Communication dated Mar. 8, 2022 from the Japanese Patent Office in Application No. 2020-039340.

* cited by examiner

FIG. 4

<USER MANAGEMENT TABLE>

| USER ID | USER POSITION | USER ATTRIBUTES ||| PLAYER | CHARACTER ID | CHARACTER POSITION | CHARACTER ATTRIBUTES ||| POINTS | ITEM | TEAM ID |
| --- | --- | --- | --- | --- | --- | --- | --- | --- | --- | --- | --- | --- | --- |
| | | PHYSICAL INFORMATION | ACTION HISTORY | LEVEL | | | | MOVEMENT PERFORMANCE | SIZE | MANEUVERABILITY | | | |
| 001 | ... | ... | ... | 3 (1-10) | HUNTER | 001A | ... | 5 (1-10) | 3 (1-10) | 5 (1-10) | 12345 | AAA | α |
| 002 | ... | ... | ... | 5 (1-10) | HUNTER | 002A | ... | 7 (1-10) | 2 (1-10) | 7 (1-10) | 34567 | BBB | α |
| 003 | ... | ... | ... | 2 (1-10) | FUGITIVE | 003A | ... | 4 (1-10) | 5 (1-10) | 5 (1-10) | 5678 | — | β |
| 004 | ... | ... | ... | 7 (1-10) | FUGITIVE | 004A | ... | 8 (1-10) | 1 (1-10) | 8 (1-10) | 23456 | CCC | β |
| 005 | ... | ... | ... | 3 (1-10) | HUNTER | 005A | ... | 5 (1-10) | 3 (1-10) | 5 (1-10) | 345 | — | γ |
| 006 | ... | ... | ... | 5 (1-10) | HUNTER | 006A | ... | 7 (1-10) | 2 (1-10) | 7 (1-10) | 4567 | — | γ |
| 007 | ... | ... | ... | 2 (1-10) | HUNTER | 007A | ... | 2 (1-10) | 2 (1-10) | 3 (1-10) | 789 | — | — |
| ... | ... | ... | ... | ... | ... | ... | ... | ... | ... | ... | ... | ... | ... |

LOCATION-BASED GAME SWITCHING TO INPUT INTERFACE MOVEMENT MAP

CROSS-REFERENCE TO RELATED APPLICATIONS

This application is a continuation of U.S. application Ser. No. 15/699,344 filed Sep. 8, 2017, which is based on and claims priority under 35 USC 119 from Japanese Patent Application No. 2017-027286 filed Feb. 16, 2017.

BACKGROUND

Technical Field

The present invention relates to an information processing device.

SUMMARY

According to an aspect of the invention, there is provided an information processing device including a controller that moves and controls a display of a character image in a virtual space, in accordance with a movement of a user in a real space, and an awarding unit that awards points to the user in a case in which the character image is made to overlap, in the virtual space, an other character image of an other user.

BRIEF DESCRIPTION OF THE DRAWINGS

An exemplary embodiment of the present invention will be described in detail based on the following figures, wherein:

FIG. 4 is a diagram illustrating an example of a user management table.

DETAILED DESCRIPTION

Figure 1:
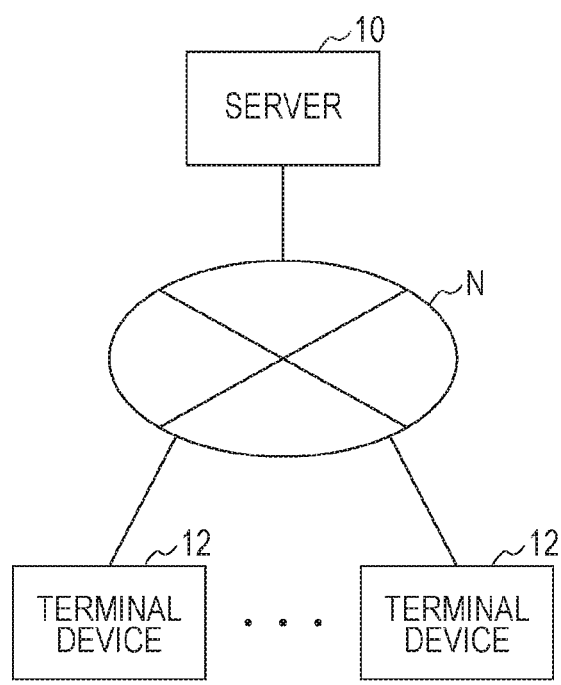
FIG. 1 is a block diagram illustrating an information processing system according to an exemplary embodiment.

An information processing system according to an exemplary embodiment of the present invention will be described with reference to FIG. 1. FIG. 1 illustrates an example of an information processing system according to the present exemplary embodiment.

The information processing system according to the present exemplary embodiment includes a server 10, and one or multiple terminal devices 12, for example. The server 10 and the terminal device 12 communicate with other devices via a communication link N such as a network, for example.

The server 10 is a device that provides a service to a user using the terminal device 12. The service is, for example, a game utilizing both real space and virtual space. The virtual space is a space corresponding to real space, or in other words, a space that resembles real space.

The terminal device 12 is a device such as a personal computer (PC) or a mobile terminal such as a smartphone, a mobile phone, or a tablet PC.

In the present exemplary embodiment, a service is provided by the server 10, and as a result, a character image in virtual space associated with the user is displayed on the terminal device 12, and the character image moves in accordance with the movement of the user in the real space. For example, in the virtual space, in a case in which the character image associated with a user overlaps with another character image associated with another user, or in a case in which the character image is joined to another character image, points are awarded to that user.

Hereinafter, as an example, a case will be described in which a game of a hunter (hunter player) using a character image to capture a fugitive (fugitive player) is provided as a service. Users participating in this game join the game by registering as one of either a hunter player or a fugitive player. A hunter player is awarded points by capturing a character image associated with a fugitive player (hereinafter called the "fugitive character image") with a character image associated with the hunter player (hereinafter called the "hunter character image"), for example. The fugitive player is awarded points by evading capture of the fugitive character image by the hunter player, for example. Hereinafter, this game is described as being provided as a service, but obviously services other than this game may also be provided.

Figure 2:
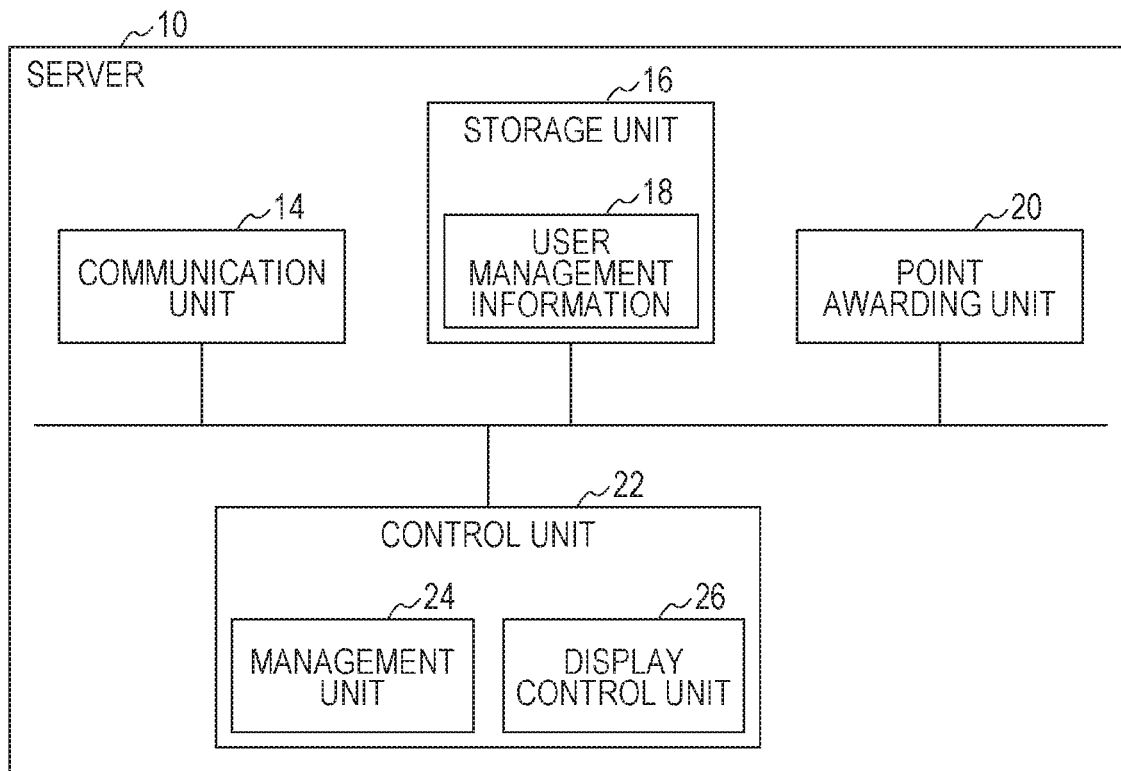
FIG. 2 is a block diagram illustrating a server according to an exemplary embodiment.

Hereinafter, the configuration of the server 10 will be described in detail with reference to FIG. 2. FIG. 2 illustrates a configuration of the server 10.

The communication unit 14 is a communication interface, and includes a function of transmitting data to other devices, and a function of receiving data from other devices. The communication unit 14 may be a communication interface provided with a wireless communication function, or a communication interface provided with a wired communication function.

The storage unit 16 is a storage device such as a hard disk or memory (such as an SSD, for example). The storage unit 16 stores user management information 18, various data, various programs, server address information indicating the address of the server 10, and the like. Information such as the user management information 18 stored in the storage unit 16 is provided periodically or at a specified timing to the terminal devices 12 of users utilizing the service provided by the server 10 (for example, users participating in the game). With this arrangement, information stored in the terminal device 12 may be updated.

The user management information 18 is information for managing users utilizing the service provided by the server 10 (for example, users participating in the game), and is information indicating user identification information for identifying a user, attributes of the user, the position in virtual space of a character image associated with the user, attributes of the character image, points awarded to the user, and the like, for example.

The point awarding unit 20 is provided with a function of awarding points to users (hunter players and fugitive players) in accordance with the capture of a fugitive character image by a hunter player, or the evasion of a fugitive character by a hunter player. For example, in a case in which a hunter character image captures a fugitive character image in the virtual space, the point awarding unit 20 awards points to the hunter player associated with the hunter character image. For example, in a case in which the hunter character image overlaps with the fugitive character image, or in a case in which the hunter character image is joined to a fugitive character image, the fugitive character image is captured by the hunter character image. The hunter character image may also capture the fugitive character image by using items or the like.

In addition, the point awarding unit 20 awards points to a fugitive player associated with a fugitive character image in accordance with the distance over which or the time during which that fugitive character image moved without being captured by a hunter character image. The moved distance is the moved distance of the fugitive player in the real space, or the moved distance of the fugitive character image in the virtual space, for example. The point awarding unit 20 may also award points to a fugitive player associated with a fugitive character image in a case in which the fugitive character image evades a capture action performed by a hunter character image.

The points may be points for acquiring (purchasing) items usable in the virtual space, points for purchasing products at shops in the real space, points which can be exchanged for other points provided in the real space, or points which can be exchanged for products in the real space, for example.

The control unit 22 is provided with a function of controlling the operation of each unit of the server 10. Also, the control unit 22 includes a management unit 24 and a display control unit 26.

The management unit 24 manages users who utilize the service provided by the server 10 (for example, users participating in the game), and is provided with a function of creating and updating the user management information 18. For example, the management unit 24 acquires information such as user identification information for identifying a user, user position information indicating the position of the user in the real space, and user attribute information indicating attributes of the user, and registers this information in the user management information 18. The management unit 24 acquires the above information from the terminal device 12, for example. User position information is acquired by using the Global Positioning System (GPS), for example. For example, the terminal device 12 is provided with a GPS function, acquires information indicating the position of the terminal device 12 itself as user position information, and transmits the user position information to the server 10. In addition, the management unit 24 may also conduct a login process by which a user logs in to the service provided by the server 10. A user who logs in successfully (for example, a user authorized to use the service) is able to use the service. For example, such a user becomes able to participate in the game.

The display control unit 26 is provided with a function of causing various information to be displayed on the terminal device 12. For example, the display control unit 26 creates a map expressing a virtual space corresponding to real space, and by providing the data of the map to the terminal device 12, causes the map to be displayed on the terminal device 12. For example, the display control unit 26 creates a map including a position of a user in the real space, and causes the map to be displayed on the terminal device 12 of that user. Also, the display control unit 26 creates a character image (for example, a hunter character image or a fugitive character image) associated with a user utilizing the service provided by the server 10, and by providing the data of the character image to the terminal device 12 of that user, causes the character image to be displayed on the terminal device 12. For example, the display control unit 26 displays a character image on the map described above, and moves the character image over the map in accordance with the movement of the user in the real space. In addition, the display control unit 26 causes a character image associated with a certain user to be displayed on the terminal device 12 of another user participating in the game. For example, the display control unit 26 causes a map to be displayed on the terminal device 12 of each user, and displays each character image associated with each user (on the map displayed on the terminal device 12 of each user). With this arrangement, on the terminal device 12 of each user, the character image associated with that user himself, as well as a character image associated with another user participating in the game, are displayed.

Figure 3:
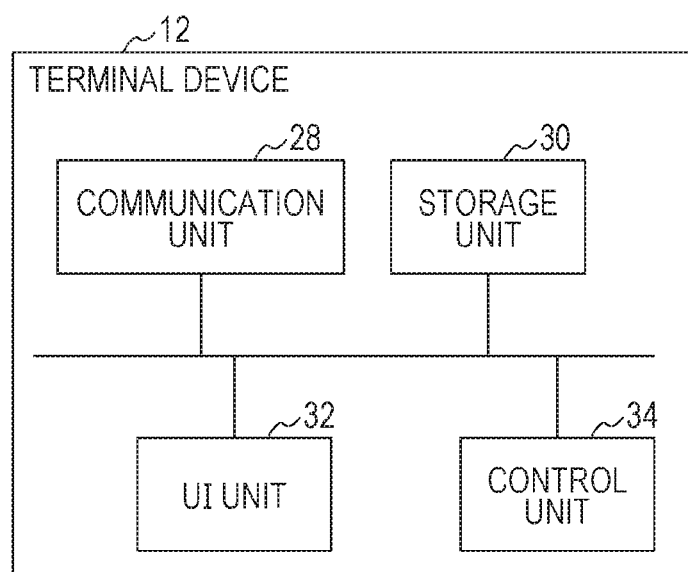
FIG. 3 is a block diagram illustrating a terminal device.

Hereinafter, a configuration of the terminal device 12 will be described in detail with reference to FIG. 3. FIG. 3 illustrates a configuration of the terminal device 12.

The communication unit 28 is a communication interface, and includes a function of transmitting data to other devices, and a function of receiving data from other devices. The communication unit 28 may be a communication interface provided with a wireless communication function, or a communication interface provided with a wired communication function.

The storage unit 30 is a storage device such as a hard disk or memory (such as an SSD, for example), and stores various programs, various data, address information of the server 10, and the like.

The UI unit 32 is a user interface, and includes a display unit and an operating unit. The display unit is a display device such as a liquid crystal display, for example. The operating unit is an input device such as a touch panel, a keyboard, or a mouse, for example. Obviously, a user interface combining a display unit and an operating unit (for example, a touchscreen display, including a device that displays a keyboard or the like electronically on a display) is also acceptable.

The control unit 34 controls the operation of each unit of the terminal device 12. The control unit 34, under control by the display control unit 26 of the server 10, causes various information provided by the server 10 to be displayed on the UI unit 32, for example. For example, in a case in which the data of a map and a character image is provided by the server 10, the control unit 34 causes the provided map and character image to be displayed on the UI unit 32.

Note that the user management information 18 may also be stored in the storage unit 30 of the terminal device 12, and the terminal device 12 may be provided with the point awarding unit 20, the management unit 24, and the display control unit 26 provided in the server 10, and provided with functions similar to the server 10. In this case, the terminal device 12 communicates with other terminal devices 12 to thereby manage users participating in the game, award points to users, and the like. Also, in this case, the user management information 18 may also not be stored in the server 10, and the server 10 may also not be provided with the point awarding unit 20, the management unit 24, and the display control unit 26.

Hereinafter, the information processing system according to the present exemplary embodiment will be described in further detail.

An example of the user management information 18 will be described with reference to FIG. 4. FIG. 4 illustrates an example of a user management table as the user management information 18. The user management table is created by the management unit 24, and the data thereof is stored in the storage unit 16 of the server 10.

In the user management table, for example, for each user participating in the game, a user ID that acts as user identification information, user position information that indicates the position of the user in the real space, user attribute information, information that indicates a player in the game, an ID of a character image (character ID) associated with the user, character position information that indicates the position of the character image in the virtual space, character attribute information, points awarded to the user, information that indicates items acquired by the user, and a team ID that acts as team identification information are associated with each other. Also, besides the above information, information such as the address information of the terminal device 12 of the users participating in the game is registered in the user management table.

The user ID is input by a user into the terminal device 12 when the user logs in to the game provided by the server 10, for example, and is transmitted from the terminal device 12 to the server 10. Obviously, the user ID may also be preregistered in the user management table, or issued by the management unit 24.

The user position information is acquired by a GPS function included in the terminal device 12, for example, and is transmitted from the terminal device 12 to the server 10. While the user participates in the game, the terminal device 12 transmits user position information to the server 10 on a predetermined time interval, for example. With this arrangement, while the user participates in the game, the position of the user is managed by the server 10.

User attribute information is information that indicates attributes of a user (player), and includes physical information, illness information, action history information, and level information, for example. User attribute information is transmitted from the terminal device 12 to the server 10 during or after login to the game, for example. Obviously, user attribute information may also be preregistered in the user management table.

The physical information is information that indicates the physical features of the user (such as age, sex, height, weight, and a physique indicator (for example, body mass index (BMI)), for example). The physical information may be input into the terminal device 12 by the user, or transmitted from another device to the terminal device 12, for example.

The illness information is information that indicates a current illness of the user, or an illness that the user wants to protect against. The illness information may be input into the terminal device 12 by the user, or transmitted from another device to the terminal device 12, for example.

The action history information is information that indicates an action history of the user, and includes information that indicates the movement history of the user in the real space (such as moved distance, movement speed, number of steps, and the date and time of moving), and information that indicates a meal history of the user (such as the content of a meal and the calories consumed), for example. The movement history is acquired by the terminal device 12, for example. The terminal device 12 is provided with a function of acting as a pedometer, for example, and by having the user move while carrying the terminal device 12, the terminal device 12 measures information such as the moved distance, the movement speed, and the number of steps, and manages this information as a movement history. Obviously, a pedometer other than the terminal device 12 may also be used to acquire a movement history. The information that indicates a meal history is input into the terminal device 12 by the user, for example. The information that indicates a meal history may be input as text information, input as image data by taking an image of the food with a camera or the like, or input as image data by taking an image of a receipt or the like that indicates the meal content when eating out. For example, by performing image analysis on such image data, information that indicates a meal history is acquired.

The level information is information that indicates a level of the user in the game. The level is set to a value from 1 to 10, for example, in which Level 1 is the lowest level, and Level 10 is the highest level. The level is set to an initial value when the user first joins the game, for example. The initial value may be a predetermined level, or a level corresponding to the conditions of the game or the like. For example, the initial value is set to Level 1. As the user's achievements increase, the level is set higher (the numerical value rises). The management unit 24 changes the level of a user participating in the game as a hunter player in accordance with the number of fugitive players (fugitive character images) the hunter player has captured, for example. For example, if a hunter player has captured a large number of fugitive players, the level of the hunter player increases. This is because the user's achievements as a hunter player are recognized and rewarded. On the other hand, the management unit 24 changes the level of a user participating in the game as a fugitive player in accordance with the distance and time that the fugitive player moves without being captured by a hunter player, for example. For example, as the moved distance and the moved time become longer, the level of the fugitive player increases. This is because the fugitive player's achievements in not being captured are recognized and rewarded. Obviously, the management unit 24 may also change the level of a hunter player in accordance with the moved distance and moved time of the hunter player. For example, as the moved distance and moved time of a hunter player become longer, the management unit 24 increases the level of the hunter player. This is because the time and distance spent hunting are recognized and rewarded. As another example, the management unit 24 may also lower the level of a hunter player as the time and moved distance over which the hunter player is unable to capture a fugitive player (fugitive character image) become longer. This is because the user's achievements as a hunter player are lacking. In accordance with a user's level, character attributes may be changed, a rate of point awarding to the user (for example, a multiplier) may be changed, or a rate at which items appear may be changed, for example. For example, in a case in which the rate of point awarding is x2, any points acquired in the future may be doubled, or the points already acquired so far may be doubled.

The player is a role assigned to a user participating in the game, and is either a hunter player (the chasing side) or a fugitive player (the escaping side), for example. The player may be selected by the user when joining the game (for example, when logging in to the game), preselected, or selected randomly by the management unit 24. When joining the game, the user may select a player himself, or request the management unit 24 for a selection. For example, if the user logs in to the game using the terminal device 12, a player selection screen is displayed on the UI unit 32 of the terminal device 12, and on the player selection screen, the user may select a player himself or request the management unit 24 for a selection. Note that when joining or while participating in the game, the display control unit 26 may also cause the UI unit 32 of the terminal device 12 to display information such as information indicating the number of users (players) currently participating in the game, information indicating the number of hunter players currently participating, and information indicating the number of fugitive players currently participating. With this arrangement, the user is provided with information that serves as a reference when the user selects a player. Also, in a case in which the management unit 24 selects a player, the management unit 24 may also select the player of a newly joined user in accordance with the ratio of the number of currently participating hunter players and fugitive players. For example, the management unit 24 may select a player so that the number of hunter players and the number of fugitive players currently participating become equal, select a player so that the number of fugitive players becomes greater than the number of hunter players, or select a player so that the number of hunter players becomes greater than the number of fugitive players. By controlling the numbers of various types of players in this way, the handicap between hunter players and fugitive players is controlled, thereby changing the game balance and increasing the fun of the game.

The character ID is information for identifying the character image associated with the user, and is issued by the management unit 24 when joining the game, for example. Obviously, the character ID may also be preregistered in the user management table.

The character position information is information indicating the position of the character image in the virtual space, and the display control unit 26 displays the character image at the position indicating by the character position information on the map expressing the virtual space. Also, the management unit 24 changes the character position information in accordance with the movement of the user in the real space, and the display control unit 26 changes the display position of the character image on the map in accordance with the changes in the character position information. In other words, the character image moves on the map in accordance with the movement of the user in the real space.

The movement speed of the character image on the map is a speed obtained by converting the movement speed of the user in the real space to a movement speed in the virtual space. For example, the movement speed of the character image on the map is equal to the movement speed when converting the movement speed of the user in the real space to a movement speed in the virtual space (that is, a movement speed accurately reflecting the movement speed of the user in the real space), and the position of the character image in the virtual space accurately reflects the position of the user in the real space, and matches the position of the user in the real space.

As described later, the movement speed of a character image in the virtual space is changed in some cases, depending on factors such as attributes of the user, attributes of the character image, the acquisition status of items and points, and team organization. In this case, the movement speed of the character image in the virtual space is not equal to the movement speed when converting the movement speed of the user in the real space to a movement speed in the virtual space (that is, not a movement speed accurately reflecting the movement speed of the user in the real space). For this reason, the position of the character image in the virtual space does not accurately reflect the position of the user in the real space, and does not match the position of the user in the real space. In other words, since the moved distance per unit time is different between the real space and the virtual space, the position of the character image in the virtual space becomes shifted away from the position of the user in the real space. As the moved distance of the user in the real space becomes longer, the shift becomes greater. For example, the movement speed of the character image in the virtual space becomes faster or slower than the movement speed when converting the movement speed of the user in the real space to a movement speed in the virtual space, and as a result, the position of the character image in the virtual space no longer matches the position of the user in the real space. In the game, this mismatch may work to the user's advantage, but may also work to the user's disadvantage. For example, as the movement speed of the character image becomes faster, the character image is able to move a longer distance per unit time in the virtual space. For this reason, a hunter character image gains an advantage in capturing, while a fugitive character image gains an advantage in escaping. Conversely, as the movement speed of the character image becomes slower, a hunter character image suffers a disadvantage in capturing, while a fugitive character image suffers a disadvantage in escaping.

The character attribute information is information indicating attributes (for example, performance) of the character image, and includes movement performance information, size information, and maneuverability information, for example. The character attribute information is set to initial values when a user first joins the game, for example, and is changed in some cases in accordance with factors such as the progress of the game, user attributes, and user experience. The initial values may also be changed in accordance with factors such as user attributes. Also, the character attribute information may be changed in accordance with factors such as user attributes (physical features, action history, level), the acquisition status of items and points, and team organization.

The movement performance information included in the character attribute information is information indicating the movement performance of the character image in the virtual space. The movement performance is the movement speed of the character image in the virtual space, for example. The movement performance is set to a value from 1 to 10, for example, in which a movement performance of 1 is the lowest movement performance, and a movement performance of 10 is the highest movement performance. The movement performance is set to an initial value when the user first joins the game, for example. The initial value may be a predetermined value, or a value corresponding to the conditions of the game or the like. As the value of the movement performance increases, the movement performance rises (for example, the movement speed becomes faster). For example, a movement speed with a value of "5" is a speed equal to the movement speed of the user in the real space (a speed accurately reflecting the movement speed of the user in the real space), or in other words, a speed equal to the movement speed when converting the movement speed of the user in the real space to a movement speed in the virtual space. For example, a movement performance of 5 is used as the initial value.

The management unit 24 may also change the movement performance in accordance with specific conditions (such as user attributes or the acquisition status of items and points, for example). Hereinafter, modification of the movement performance will be described in detail.

The management unit 24 may also raise the movement performance as the user's level increases. With this arrangement, as the user's level increases, the movement speed of the character image becomes faster.

The management unit 24 may also change the movement performance in accordance with the physical features of the user. For example, in a case in which the weight or BMI is included within a predetermined appropriate range, the management unit 24 may set the initial value of the movement performance to a standard value (for example, 5), whereas in a case in which the weight or BMI is not included within the appropriate range, the management unit 24 may set the initial value of the movement performance to less than the standard value (for example, less than 5). Since the movement performance improves if the weight, BMI, or the like is included within the appropriate range, the user is motivated to maintain his weight, BMI, or the like at an appropriate value.

The management unit 24 may also change the movement performance in accordance with an action history of the user. The management unit 24 may change the movement performance in accordance with a movement history, for example, or in other words, in accordance with the distance moved, the movement speed, or the number of steps by the user in the real space. For example, the management unit 24 may raise the movement performance as the moved distance of the user in the real space becomes longer. As another example, the management unit 24 may raise the movement performance as the number of steps by the user in the real space becomes greater. Since the movement performance improves as the moved distance becomes longer or the number of steps becomes greater, the user is motivated to move in the real space.

The management unit 24 may also change the movement performance in accordance with a meal history of the user, or in other words, in accordance with factors such as meal content and calories consumed by the user in the real space. For example, in a case in which the meal content or the number of calories consumed is included within a predetermined appropriate range, the management unit 24 may keep the movement performance at the current performance, whereas in a case in which the meal content or the number of calories consumed is not included within the appropriate range, the management unit 24 may lower the movement performance in accordance with the degree of deviation. Since the movement performance improves if the meal content or the number of calories consumed is included within the appropriate range, the user is motivated to consume meals and calories within an appropriate range.

In addition, items that continually or temporarily raise movement performance, and items that continually or temporarily lower movement performance, may also be placed in the virtual space. In this case, the display control unit 26 causes such items to be displayed on the UI unit 32 of the terminal device 12 of a user participating in the game. If a character image acquires an item inside the virtual space, the management unit 24 changes the movement performance of that character image in accordance with the item. In a case of acquiring an item that continually or temporarily raises movement performance, the management unit 24 continually or temporarily raises the movement performance of the character image that acquired the item, whereas in a case of acquiring an item that continually or temporarily lowers movement performance, the management unit 24 continually or temporarily lowers the movement performance of the character image that acquired the item. In a case in which an item is acquired, the management unit 24 may change the movement performance of some or all of the character images on the team to which belongs the user associated with the character image that acquired the item, or change the movement performance of some or all of the character images on another team.

The management unit 24 may also change the movement performance of a character image associated with a user in accordance with points acquired by that user. For example, the management unit 24 raises the movement performance as the acquired points increase. As another example, the management unit 24 may also change the movement performance of a character image associated with some or all users belonging to a team, in accordance with some or all of the acquired points of the team to which the users belong. For example, the management unit 24 raises the movement performance of the character images associated with some or all users belonging to a team as some or all of the acquired points of the team increase. By raising the movement performance as the points increase, the user is motivated to acquire points aggressively.

Size information included in the character attribute information is information indicating the display size (the size as displayed) of a character image in the virtual space (such as the overall size, the height, or the width, for example). The size is set to a value from 1 to 10, for example, in which a size of 1 is the smallest size, and a size of 10 is the largest size. The size is set to an initial value when the user first joins the game, for example. The initial value may be a predetermined value (a size of 5, for example), or a value corresponding to the conditions of the game or the like.

The management unit 24 may also change the size of the character image in accordance with specific conditions (such as user attributes or the acquisition status of items and points, for example). The management unit 24 may also change how to control the changing of the size of the character image between the case in which the user joins the game as a hunter player, and the case in which the user joins the game as a fugitive player. Hereinafter, the changing of the size of the character image will be described in detail.

The management unit 24 may change the size of the character image in accordance with the level of the user. In the case in which the user joins the game as a hunter player, the management unit 24 increases the size of the hunter character image associated with the user as the level of the user increases. As the hunter character image becomes larger, it becomes easier to make the hunter character image overlap with a fugitive character image, thereby making it easier to capture a fugitive character image (fugitive player). Conversely, as the hunter character image becomes smaller, it becomes more difficult to make the hunter character image overlap with a fugitive character image, thereby making it more difficult to capture a fugitive character image (fugitive player). In the case in which the user joins the game as a fugitive player, the management unit 24 decreases the size of the fugitive character image associated with the user as the level of the user increases. As the fugitive character image becomes larger, it becomes easier for the fugitive character image to be overlapped by a hunter character image, thereby making it easier for the fugitive character image (fugitive player) to be captured. Conversely, as the fugitive character image becomes smaller, it becomes more difficult for the fugitive character image to be overlapped by a hunter character image, thereby making it more difficult for the fugitive character image (fugitive player) to be captured. Since the difficulty of capturing and escaping is changed by changing the sizes of character images in this way, users are motivated to raise their level.

The management unit 24 may change the size of the character image in accordance with physical features of the user. In the case in which the user joins the game as a hunter player, if the weight or BMI is included within a predetermined appropriate range, for example, the management unit 24 may set the initial value of the size of the hunter character image to a standard size (for example, a size of 5), whereas if the weight or BMI is not included within the appropriate range, the management unit 24 may set the initial value of the size of the hunter character image to less than the standard size (for example, a value less than a size of 5). If the weight or BMI is not included within the appropriate range, the size of the hunter character image becomes smaller than the standard size, and it becomes difficult to make the hunter character image overlap a fugitive character image. Thus, the user (hunter player) is motivated to maintain his weight or BMI at an appropriate value. In the case in which the user joins the game as a fugitive player, if the weight or BMI is included within the appropriate range, for example, the management unit 24 may set the initial value of the size of the fugitive character image to a standard size, whereas if the weight or BMI is not included within the appropriate range, the management unit 24 may set the initial value of the size of the fugitive character image to a value greater than the standard size (for example, a value greater than the size of 5). If the weight or BMI is not included within the appropriate range, the size of the fugitive character image becomes larger than the standard size, and it becomes easier for the fugitive character image to be overlapped by a hunter character image. Thus, the user (fugitive player) is motivated to maintain his weight or BMI at an appropriate value.

The management unit 24 may change the size of the character image in accordance with an action history of the user. The management unit 24 may change the size of the character image in accordance with a movement history, for example, or in other words, in accordance with the distance moved, the movement speed, or the number of steps by the user in the real space. In the case in which the user joins the game as a hunter player, the management unit 24 may increase the size of the hunter character image as the moved distance of the user in the real space becomes longer. As another example, the management unit 24 may increase the size of the hunter character image as the number of steps by the user in the real space becomes greater. In the case in which the user joins the game as a fugitive player, the management unit 24 may decrease the size of the fugitive character image as the moved distance of the user in the real space becomes longer. As another example, the management unit 24 may decrease the size of the fugitive character image as the number of steps by the user in the real space becomes greater. By changing the size of the character image in this way, the user is motivated to move in the real space.

The management unit 24 may also change the size of the character image in accordance with a meal history of the user, or in other words, in accordance with factors such as meal content and calories consumed by the user in the real space. In a case in which the user joins the game as a hunter player, if the meal content or the number of calories consumed is included within a predetermined appropriate range, the management unit 24 may keep the size of the hunter character image at the current level, whereas if the meal content or the number of calories consumed is not included within the appropriate range, the management unit 24 may decrease the size of the hunter character image in accordance with the degree of deviation. In a case in which the user joins the game as a fugitive player, if the meal content or the number of calories consumed is included within the appropriate range, the management unit 24 may keep the size of the fugitive character image at the current size, whereas if the meal content or the number of calories consumed is not included within the appropriate range, the management unit 24 may increase the size of the fugitive character image in accordance with the degree of deviation. By changing the size of the character image in this way, the user is motivated to consume meals and calories within an appropriate range.

In addition, items that continually or temporarily increase the size of the character image, and items that continually or temporarily decrease the size of the character image, may also be placed in the virtual space. In this case, the display control unit 26 causes such items to be displayed on the UI unit 32 of the terminal device 12 of a user participating in the game. If a character image acquires an item inside the virtual space, the management unit 24 changes the size of that character image in accordance with the item. In a case of acquiring an item that continually or temporarily increases the size of the character image, the management unit 24 continually or temporarily increases the size of the character image that acquired the item, whereas in a case of acquiring an item that continually or temporarily decreases the size of the character image, the management unit 24 continually or temporarily decreases the size of the character image that acquired the item. In a case in which an item is acquired, the management unit 24 may change the size of some or all of the character images on the team to which belongs the user associated with the character image that acquired the item, or change the size of some or all of the character images on another team.

The management unit 24 may also change the size of a character image associated with a user in accordance with points acquired by that user. In the case in which the user joins the game as a hunter player, the management unit 24 increases the size of the hunter character image associated with the user as the points for that user become greater, for example. In the case in which the user joins the game as a fugitive player, the management unit 24 decreases the size of the fugitive character image associated with the user as the points for that user become greater, for example. As another example, the management unit 24 may also change the size of a character image associated with some or all users belonging to a team, in accordance with some or all of the acquired points of the team to which the users belong. For example, as some or all of the acquired points of a hunter team (a team of hunter players) become greater, the management unit 24 increases the sizes of the hunter character images associated with some or all of the users belonging to the hunter team, while as some or all of the acquired points of a fugitive team (a team of fugitive players) become greater, the management unit 24 decreases the sizes of the fugitive character images associated with some or all of the users belonging to the fugitive team. As the points of the hunter players become greater, the sizes of the hunter character images increase and make it easier to capture fugitive character images, while as the points of the fugitive players become greater, the sizes of the fugitive character images decrease and make it easier to evade captured by hunter character images. Thus, the users are motivated to acquire points aggressively.

The maneuverability information included in the character attribute information is information indicating the maneuverability of the character image in the virtual space, or in other words, how easy it is to operate (how easy it is to move) the character image on the screen. Maneuverability is set to the value from 1 to 10, for example, in which a maneuverability of 1 is the lowest maneuverability, while a maneuverability of 10 is the highest maneuverability. The maneuverability is set to an initial value when the user first joins the game, for example. The initial value may be a predetermined value (a maneuverability of 5, for example), or a value corresponding to the conditions of the game or the like. As the value of the maneuverability increases, the maneuverability becomes better. Specifically, as the value of the maneuverability increases, the character image moves more rapidly in response to user operations, while as the value of the maneuverability decreases, the character image moves more sluggishly in response to user operations.

The management unit 24 may also change the maneuverability in accordance with specific conditions (such as user attributes or the acquisition status of items and points, for example). Hereinafter, modification of the maneuverability will be described in detail.

The management unit 24 may also raise the maneuverability as the user's level increases. With this arrangement, as the user's level increases, the character image becomes easier to operate.

The management unit 24 may also change the maneuverability in accordance with the physical features of the user. For example, in a case in which the weight or BMI is included within a predetermined appropriate range, the management unit 24 may set the initial value of the maneuverability to a standard value (for example, 5), whereas in a case in which the weight or BMI is not included within the appropriate range, the management unit 24 may set the initial value of the maneuverability to less than the standard value (for example, less than 5). Since a standard value is used as the initial value of the maneuverability if the weight, BMI, or the like is included within an appropriate range, and a value less than the standard value is used as the initial value of the maneuverability if the weight, BMI, or the like is not included within the appropriate range, the user is motivated to maintain his weight, BMI, or the like at an appropriate value.

The management unit 24 may also change the maneuverability in accordance with an action history of the user. The management unit 24 may change the maneuverability in accordance with a movement history, for example, or in other words, in accordance with the distance moved, the movement speed, or the number of steps by the user in the real space. For example, the management unit 24 may raise the maneuverability as the moved distance of the user in the real space becomes longer. As another example, the management unit 24 may raise the maneuverability as the number of steps by the user in the real space becomes greater. Since the maneuverability improves as the moved distance becomes longer or the number of steps becomes greater, the user is motivated to move in the real space.

The management unit 24 may also change the maneuverability in accordance with a meal history of the user, or in other words, in accordance with factors such as meal content and calories consumed by the user in the real space. For example, in a case in which the meal content or the number of calories consumed is included within a predetermined appropriate range, the management unit 24 may keep the maneuverability at the current maneuverability, whereas in a case in which the meal content or the number of calories consumed is not included within the appropriate range, the management unit 24 may lower the maneuverability in accordance with the degree of deviation. Since the maneuverability is maintained if the meal content or the number of calories consumed is included within an appropriate range, and the maneuverability is lowered if the meal content or the number of calories consumed is not included within the appropriate range, the user is motivated to consume meals and calories within an appropriate range.

In addition, items that continually or temporarily raise maneuverability, and items that continually or temporarily lower maneuverability, may also be placed in the virtual space. In this case, the display control unit 26 causes the items to be displayed on the UI unit 32 of the terminal device 12 of a user participating in the game. If a character image acquires an item inside the virtual space, the management unit 24 changes the maneuverability of that character image in accordance with the item. In a case of acquiring an item that continually or temporarily raises maneuverability, the management unit 24 continually or temporarily raises the maneuverability of the character image that acquired the item, whereas in a case of acquiring an item that continually or temporarily lowers maneuverability, the management unit 24 continually or temporarily lowers the maneuverability of the character image that acquired the item. In a case in which an item is acquired, the management unit 24 may change the maneuverability of some or all of the character images on the team to which belongs the user associated with the character image that acquired the item, or change the maneuverability of some or all of the character images on another team.

The management unit 24 may also change the maneuverability of a character image associated with a user in accordance with points acquired by that user. For example, the management unit 24 raises the maneuverability as the acquired points increase. As another example, the management unit 24 may also change the maneuverability of a character image associated with some or all users belonging to a team, in accordance with some or all of the acquired points of the team to which the users belong. For example, the management unit 24 raises the maneuverability of the character images associated with some or all users belonging to a team as some or all of the acquired points of the team increase.

The points are a numerical score won by the user. For example, the management unit 24 awards points to the user in accordance with the movement history of the user in the real space, the level of the user, the number of fugitive character images that the user has captured, the escape distance of a fugitive character, the acquisition of items, and the like.

The items are placed in the virtual space, and have a function of changing attributes of the character image. For example, there are items that change the movement performance of the character image, items that change the size of the character image, items that change the maneuverability of the character image, items that change the rate of point awarding (for example, a multiplier) for points acquired by the user, items that make the character image invisible for a predetermined amount of time, items enabling a fugitive character image to evade captured by a hunter character image for a predetermined amount of time, and the like. Items may be placed in predetermined locations in the virtual space, or placed in different locations depending on the time. For example, the display control unit 26 causes the UI unit 32 of the terminal device 12 to display a map expressing the virtual space, and displays images expressing items (item images) in the virtual space. The display control unit 26 may display item images at predetermined locations in the virtual space, or display item images at different locations depending on the time. A shop may also be placed in the virtual space, and items may be sold at the shop. In this case, the user is able to acquire an item by exchanging the user's own points for the item at the shop.

The team ID is information for identifying a team to which belongs the user participating in the game. There are two types of teams, namely, one or multiple hunter teams to which hunter players belong, and one or more fugitive teams to which fugitive players belong. When joining the game, the user may select a team himself, or request the management unit 24 for a selection. For example, if the user logs in to the game using the terminal device 12, a player selection screen is displayed on the UI unit 32 of the terminal device 12, and on the player selection screen, the user may select a player and a team himself or request the management unit 24 to make at least one of the selection of a player and the selection of a team. Note that when joining or while participating in the game, the display control unit 26 may also cause the UI unit 32 of the terminal device 12 to display information indicating the numbers of hunter teams and fugitive teams, the number of users belonging to each team, and the like. With this arrangement, the user is provided with information that serves as a reference when the user selects a team. Also, in a case in which the management unit 24 selects a team, the management unit 24 may also select the team for a newly joined user in accordance with the number of users belonging to each team. For example, the management unit 24 may assign users to teams so that the number of users belonging to each team becomes equal, assign users to teams so that the number of users belonging to a fugitive team becomes greater than the number of users belonging to a hunter team, or assign users to team so that the number of users belonging to a hunter team becomes greater than the number of users belonging to a fugitive team. Obviously, a user may also join the game without belonging to a team. In the example illustrated in FIG. 4, users "001" and "002" belong to a hunter team a as hunter characters. Users "003" and "004" belong to a fugitive team p as fugitive characters. Users "005" and "006" belong to a hunter team y as hunter characters. A user "007" is participating in the game as a hunter character, but does not belong to a team. An upper limit may also be set on the number of users able to join the same team.

Note that in a case in which a user logs out (withdraws from) the game, information related to that user (such as user attribute information, character attribute information, points, and item information, for example) may be saved in the user management table, or removed from the user management table. In a case in which information related to a user is saved in the user management table, when the relevant user logs in to the game again after logging out, the information related to that user saved in the user management table is used in the game when the user logs in again. With this arrangement, in the game when the user logs in again, user attributes and character attributes from the last time are used to set parameters such as the character image and point acquisition rate, and in addition, the points and items acquired last time become usable.

Hereinafter, the game provided by the server 10 will be described in detail.

Figure 5:
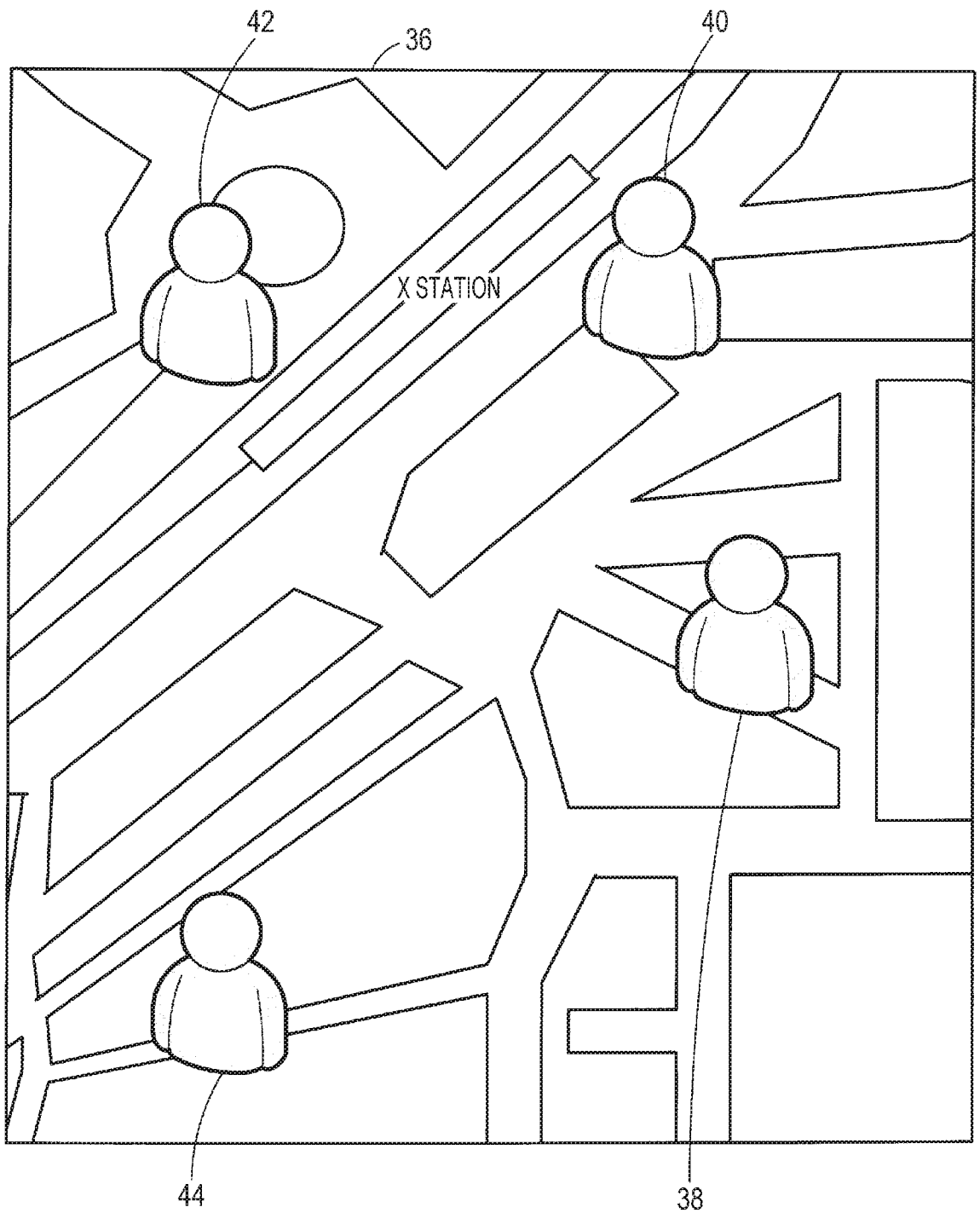
FIG. 5 is a diagram illustrating an example of a map.

If a user uses the terminal device 12 to log in to the game, data of a map expressing a virtual space is transmitted from the server 10 to the terminal device 12, and the map is displayed on the UI unit 32 of the terminal device 12. The map expresses a virtual space corresponding to the real space, and is a map including the position of the user in the real space. FIG. 5 illustrates an example of the map. On the map 36, as an example, hunter character images 38 and 40, and fugitive character images 42 and 44 are displayed. Note that control of the display of the map is conducted by the control unit 34 of the terminal device 12, under control by the display control unit 26 of the server 10.

For example, the hunter character image 38 is associated with a user A acting as a hunter player, and is the character image operated by the user A. The hunter character image 38 is displayed moving over the map 36, in correspondence with the movement of the user A in the real space. The hunter character image 40 is associated with a user B acting as a hunter player, and is the character image operated by the user B. The hunter character image 40 is displayed moving over the map 36, in correspondence with the movement of the user B in the real space. The fugitive character image 42 is associated with a user C acting as a fugitive player, and is the character image operated by the user C. The fugitive character image 42 is displayed moving over the map 36, in correspondence with the movement of the user C in the real space. The fugitive character image 44 is associated with a user D acting as a fugitive player, and is the character image operated by the user D. The fugitive character image 44 is displayed moving over the map 36, in correspondence with the movement of the user D in the real space. Note that a user may also be an artificial intelligence (AI). In this case, the movement of the character image associated with that user is controlled by the artificial intelligence. Note that control of the display of each character image is conducted by the control unit 34 of the terminal device 12, under control by the display control unit 26 of the server 10.

For example, suppose that the map 36 is displayed on the terminal device 12 of the user A associated with the hunter character image 38. In this case, the map 36 includes the position of the user A in the real space. Likewise, a map including one's own position is also displayed on the terminal devices 12 of the other users associated with the other character images.

The users A and B acting as hunter players may belong to the same hunter team or to respectively different hunter teams, or each may participate in the game without belonging to any team. Similarly, the users C and D acting as fugitive players may belong to the same fugitive team or to respectively different fugitive teams, or each may participate in the game without belonging to any team.

Note that the game may be conducted during a predetermined time, or may be conducted within the range of a predetermined place. For example, the game may be executed within the range displayed by the map 36. Also, the game may be held in a specific region in the real space. With this arrangement, people gather in the specific region for the purpose of joining the game, leading to revitalization of the specific region in some cases.

Figure 6:
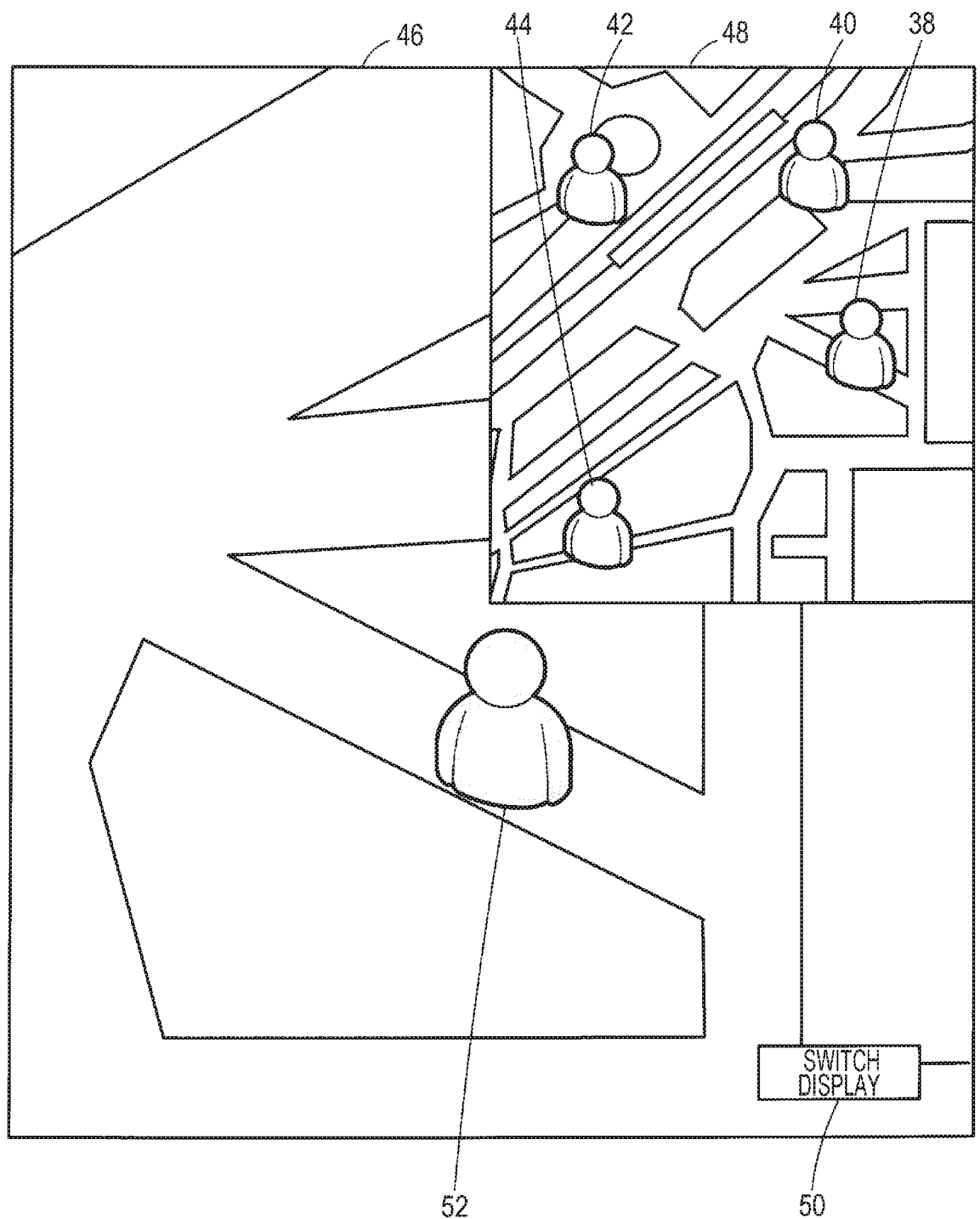
FIG. 6 is a diagram illustrating an example of a map.

The map 36 illustrated in FIG. 5 is a map corresponding to one screen, but multiple screens may be displayed on the UI unit 32 of the terminal device 12, and a map may be displayed on each screen. FIG. 6 illustrates an example of displaying two maps. In the example illustrated in FIG. 6, a first screen and a second screen are displayed on the UI unit 32 of the terminal device 12 of the user A, in which an enlarged map 46 is displayed on the first screen, and a reduced map 48 is displayed on the second screen. The enlarged map 46 is an enlarged map enabling the user to see over a short-distance range, or in other words, is a map expressing a narrow range in the virtual space. The reduced map 48 is a reduced map enabling the user to see over a long-distance range, or in other words, is a map expressing a broad range in the virtual space.

A Switch Display button image 50 for switching the display of the enlarged map 46 and the reduced map 48 may also be displayed. If the user operates (presses, for example) the Switch Display button image 50, properties such as the display sizes of the enlarged map 46 and the reduced map 48, the types of maps displayed on the screens, and the like are changed, for example. In the example illustrated in FIG. 6, the display area of the enlarged map 46 is greater than the display area of the reduced map 48, but by having the user operate the Switch Display button image 50, the size of the display area of each map is switched, and as a result, the display area of the reduced map 48 may become greater than the display area of the enlarged map 46. As another example, in response to the operation of the Switch Display button image 50, the display mode may be switched between a single-screen display (a mode in which one of either the enlarged map 46 or the reduced map 48 is displayed) and a multi-screen display (a mode in which both the enlarged map 46 and the reduced map 48 are displayed). A map may also be displayed in full screen.

Note that although two maps are displayed in the example illustrated in FIG. 6, three or more maps, including a medium-distance map enabling the user to see over a medium-distance range, may also be displayed, and a subjective map viewed from the perspective of another user may also be displayed. The data of these maps are created by the display control unit 26 of the server 10 and sent to the terminal device 12.

For example, the reduced map 48 is the same map as the map 36 illustrated in FIG. 5, and similarly to the map 36, each character image is displayed on the reduced map 48. On the enlarged map 46, the hunter character image 52 associated with the user A is displayed. The hunter character image 52 on the enlarged map 46 is an enlarged image of the hunter character image 38 on the reduced map 48.

Figure 7:
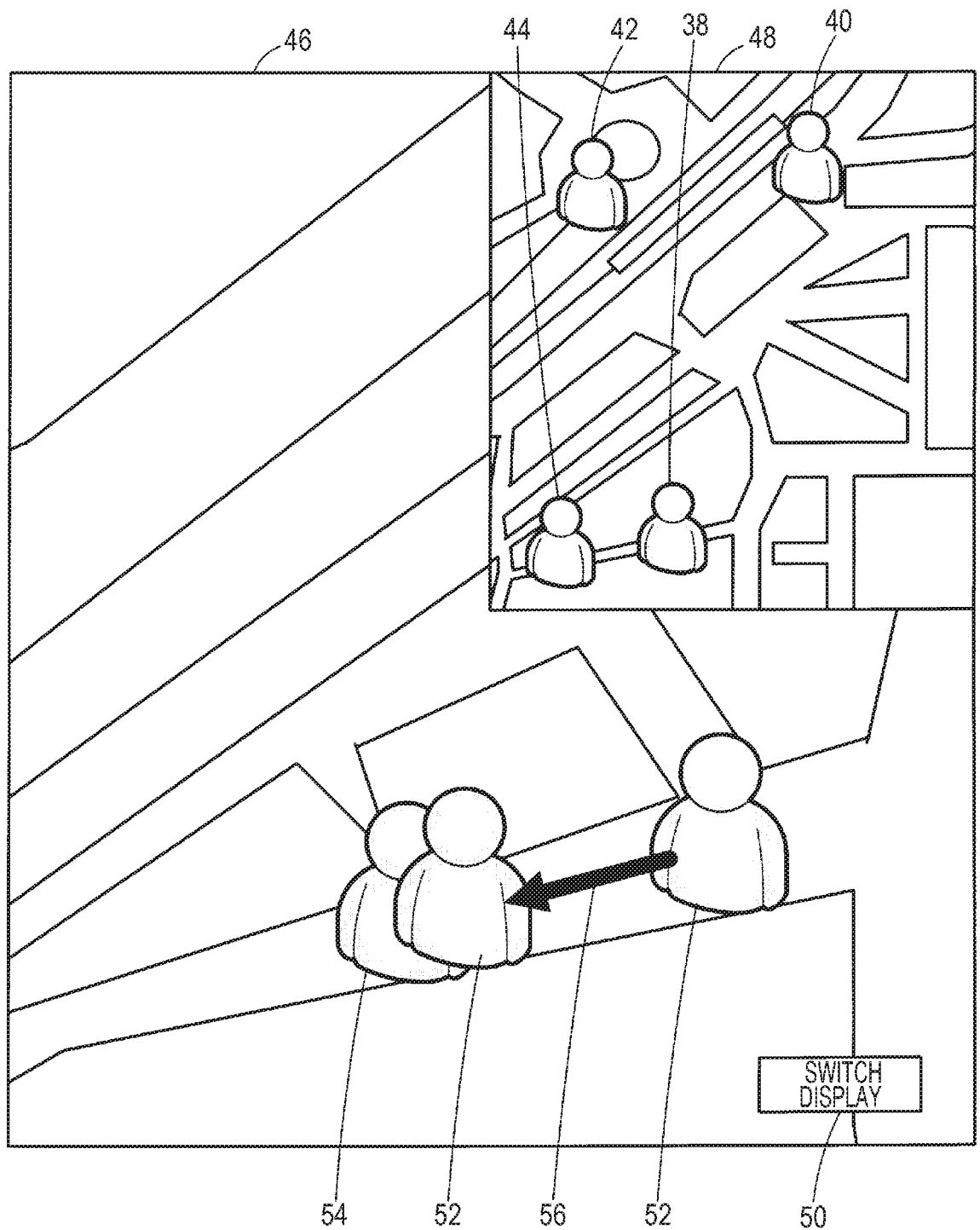
FIG. 7 is a diagram illustrating an example of a map.

Hereinafter, an operation of capturing a fugitive character image will be described in detail with reference to FIG. 7. FIG. 7 illustrates the enlarged map 46 and the reduced map 48, similarly to FIG. 6. Suppose that the enlarged map 46 and the reduced map 48 are being displayed on the UI unit 32 of the terminal device 12 of the user A. On the enlarged map 46, a hunter character image 52 associated with the user A and a fugitive character image 54 associated with the user D are displayed. The fugitive character image 54 on the enlarged map 46 is an enlarged image of the fugitive character image 44 on the reduced map 48.

For example, in a case in which the distance between multiple character images in the virtual space becomes less than or equal to a predetermined distance threshold, the mode of the game becomes a close combat mode, and the multiple character images whose distance between each other is less than or equal to the distance threshold become the targets of the close combat mode. In the close combat mode, the character images set as the targets of the close combat mode become operable by users. For example, in a case in which the distance between a hunter character image and a fugitive character image in the virtual space becomes less than or equal to a predetermined threshold distance, the mode of the game becomes a close combat mode, and the hunter character image and the fugitive character image whose distance between each other is less than or equal to the threshold distance become the targets of the close combat mode. In the close combat mode, the hunter character image and the fugitive character image set as the targets of the close combat mode become operable by users. In other words, on the terminal device 12 of the user associated with the hunter character image (that is, the hunter player), the hunter character image becomes operable by that user (the hunter player), while on the terminal device 12 of the user associated with the fugitive character image (that is, the fugitive player), the fugitive character image becomes operable by that user (the fugitive player). For example, a user is able to use an indicator such as a finger or a stylus to specify the character image associated with oneself displayed on the UI unit 32 of one's own terminal device 12, and move the character image on the map to alter (shift) the position of the character image. A character image which is not a target of the close combat mode is not operable.

To describe in terms of the example illustrated in FIG. 7, in a case in which the distance between the hunter character image 52 (38) and the fugitive character image 54 (44) becomes less than or equal to a distance threshold, the mode of the game switches to the close combat mode. The targets of the close combat mode are the hunter character image 52 (38) and the fugitive character image 54 (44), or in other words, the users A and D. On the terminal device 12 of the user A, the hunter character image 52 becomes operable by the user A, while on the terminal device 12 of the user D, the fugitive character image 54 becomes operable by the user D. On the UI unit 32 of the terminal device 12 of the user D, a map including the position of the user D and displaying the fugitive character image 54 and the hunter character image 52 (for example, an enlarged map similar to the enlarged map 46, or the reduced map 48) is displayed, and the user D is able to operate the fugitive character image 54 on the map. Note that one of either the character image on the enlarged map 46 or the character image on the reduced map 48 may become operable, or both may become operable.

In a case in which the distance between the hunter character image and the fugitive character image exceeds the distance threshold, the close combat mode is canceled, and the character images associated with the users not in close combat mode cease to be operable. For example, in the situation illustrated in FIGS. 5 and 6, the mode has not switched to the close combat mode, and thus the respective character images are not operable.

Note that in a case in which the distance between a user acting as a hunter player and a user acting as a fugitive player in the real space becomes less than or equal to a predetermined threshold (for example, 20 m), the mode may switch to the close combat mode, and the character images may become operable on the terminal devices 12 of those users.

As another example, while one map 36 is being displayed on the UI unit 32 of the terminal device 12 of the user A as illustrated in FIG. 5, if the distance between the hunter character image 52 and the fugitive character image 54 in the virtual space becomes less than or equal to a distance threshold, the enlarged map 46 and the reduced map 48 may be displayed with the enlarged map 46 displayed larger as illustrated in FIG. 7, or the enlarged map 46 may be displayed in full screen. A similar map is also displayed on the UI unit 32 of the terminal device 12 of the user D acting as a fugitive player. As another example, in a case in which the distance in the real space between the user A acting as a hunter player and the user D acting as a fugitive player becomes less than or equal to a threshold, the enlarged map 46 and the reduced map 48 may be displayed, or the enlarged map 46 may be displayed in full screen. When the map is changed to the enlarged map 46, the hunter character image 52 and the fugitive character image 54 become operable.

For example, as illustrated in FIG. 7, the user A acting as a hunter player uses one's own terminal device 12 to operate one's own hunter character image 52, and if the user A moves the hunter character image 52 to overlap with all or some of the fugitive character image 54 as indicated by the arrow 56, the capture of the fugitive character image 54 by the hunter character image 52 is successful. For example, the user A can use an indicator such as a finger or a stylus to specify the hunter character image 52 on the screen, and move the hunter character image 52 on the enlarged map 46. The user D acting as a fugitive player uses one's own terminal device 12 to operate one's own fugitive character image 54, and thereby can avoid capture by the hunter character image 52, or in other words, avoid the overlapping of the hunter character image 52 onto the fugitive character image 54. For example, the user D can use an indicator such as a finger or a stylus to specify the fugitive character image 54 on the screen and move the fugitive character image 54 on the enlarged map 46, and thereby avoid overlap by the hunter character image 52 to avoid capture.

As another example, in a case in which the user A uses one's own terminal device 12 to join one's own hunter character image 52 to the fugitive character image 54 (for example, in the case in which the user A traces a line from the hunter character image 52 to the fugitive character image 54 on the screen with an indicator such as a finger or a stylus), the capture of the fugitive character image 54 by the hunter character image 52 is successful. In this case, by moving the fugitive character image 54 (shifting the position of the fugitive character image 54), the user D is able to avoid the joining of the hunter character image 52 and the fugitive character image 54 to avoid capture.

In a case in which the capture of a fugitive character image is successful, the capturing user is awarded points. The rate of point awarding may also be changed depending on the number of fugitive character images that have been captured. In a case in which the fugitive player operates a fugitive character image and the capture of the fugitive character image is unsuccessful, points may be deducted from the user who performed the capture operation.

In a case in which a targeted fugitive character image successfully avoids capture in the close combat mode, the user associated with that fugitive character image may be awarded points. To describe in terms of the example illustrated in FIG. 7, in a case in which the user A moves the hunter character image 52, and in response, the user D moves the fugitive character image 54 to avoid capture by the hunter character image 52 (the case in which the hunter character image 52 is not overlapped, or the case of avoiding the joining of the images), the user D may be awarded points. As another example, in a case in which the user D targeted in the close combat mode moves in the real space, and thereby causes the distance between the fugitive character image 54 (44) and the hunter character image 52 (38) to exceed a distance threshold, or in other words, in the case in which the close combat mode is canceled, the user D may be awarded points for successfully escaping.

The points awarded to each user may also be increased or decreased in accordance with an item possessed by a user.

In the case in which the capture of a fugitive character image by a hunter player is successful, under control of the display control unit 26 of the server 10, information or an image indicating that capture is successful may be displayed on the UI unit 32 of the terminal device 12 of the hunter player, and information that escaping has failed (that one has been captured) may be displayed on the UI unit 32 of the terminal device 12 of the fugitive player. For example, a picture illustrating the fugitive character image being captured in a net or the like, a picture illustrating the fugitive character image being confined in a cage, or the like may be displayed on the UI unit 32 of the terminal device 12 of the user acting as the hunter player, or the fugitive character image may be hidden from display or displayed lit up. Such a picture or the like may also be displayed on the UI unit 32 of the terminal device 12 of the captured fugitive player and other players.

A captured fugitive player may be allowed to join the game immediately after being captured, or may be prohibited from joining the game for a predetermined amount of time. Also, under control of the display control unit 26 of the server 10, the fugitive character image associated with the captured fugitive player may also not be displayed on the UI unit 32 of the terminal device 12 of other users (for example, hunter players) for a predetermined amount of time from the time of capture. With this arrangement, even in a case in which a captured fugitive player joins the game immediately after being captured, the fugitive player is able to avoid being captured immediately by a hunter player.

In the close combat mode, the movable range of character images may also be limited. For example, a character image may be operable within a predetermined range based on the position of the character image before being operated as a reference, the movable distance by a single operation may be predetermined, or the character image may be movable only along streets displayed on the map. The movement range of a fugitive character image may be wider than the movement range of a hunter character image, or conversely, the movement range of a hunter character image may be wider than the movement range of a fugitive character image. The movement distance of a fugitive character image by one operation may be longer than the movement distance of a hunter character image, or conversely, the movement distance of a hunter character image by one operation may be longer than the movement distance of a fugitive character image. The movement range and movement distance of a character image may also be changed (increased or decreased) in accordance with an item possessed by a user. By limiting the movement range of character images in this way, the fun of the game is increased.

An upper limit may also be imposed on the number of operations of a character image (for example, three times), and a number of operations exceeding the upper limit (for example, four or more operations) may be prohibited. For example, an upper limit may be imposed on the number of operations in one or multiple instances of the close combat mode, or an upper limit may be imposed on the number of operations in one or multiple instances of the game. The number of allowed operations by a fugitive character image may be greater than the number of allowed operations by a hunter character image, or conversely, the number of allowed operated by a hunter character image may be greater than the number of allowed operations by a fugitive character image. The number of allowed operations may also be changed (increased or decreased) in accordance with an item possessed by a user. By limiting the number of operations in this way, the fun of the game is increased.

The control unit 22 of the server 10 may also notify each user that the mode of the game has switched to the close combat mode. In the case in which the mode switches to the close combat mode, each terminal device 12, under control of the control unit 22 of the server 10, emits a sound, or the terminal device 12 itself vibrates, for example. With this arrangement, each user is able to recognize that the mode has switched to the close combat mode, or in other words, that another player exists near oneself, without continuously looking at the screen of the terminal device 12.

The hunter player may also be unable to capture a fugitive player (fugitive character image) in a case in which the hunter player does not have a capturing item (such as an arrest warrant, for example). For example, the capturing item is acquirable at a location that issues capturing items in the virtual space (such as a police station, courtroom, or police box in the virtual space, for example), and a hunter player is able to acquire the capturing item by moving in the real space to move the hunter character image to that location. By placing the capturing item in a specific location, the hunter player is motivated to move in the real space to acquire the capturing item. The number of capturing items that may be acquired at once (for example, two) may also be predetermined. The number of operations by a hunter character image may also be determined in accordance with the number of capturing items. For example, a hunter player possessing two capturing items (for example, two arrest warrants) is able to perform two operations on one's own hunter character image. As another example, the number of fugitive character images which can be captured with one capturing item (for example, one arrest warrant) may also be predetermined. For example, one fugitive character image can be captured with one capturing item. Since a fugitive character image is not capturable unless a capturing item is used, the fun of the game is increased.

The hunter player may also be able to use a special item (such as a net or a gun, for example) to capture a fugitive character image without overlapping the hunter character image itself onto the fugitive character image. For example, by having the hunter player operate one's own hunter character image, a net image is thrown from the hunter character image, or an image of a bullet from a gun is fired from the hunter character image. In a case in which the net image or bullet image overlaps with a fugitive character image, that fugitive character image is captured successfully. Obviously, a function such as a net or a gun may also be usable even in cases in which the hunter player is not using a special item. In this way, all or part of the hunter character image can be judged to overlap with a fugitive character image, even in the case in which an item image such as a net image or a bullet image overlaps with the fugitive character image. Also, even if the hunter character image itself is not joined to the fugitive character image, in a case in which the above item image is joined to the fugitive character image, all or part of the hunter character image may be judged to be joined to the fugitive character image, and the fugitive character image can be captured.

In a case in which a fugitive player acquires an escaping item, the fugitive character image may exhibit a special power for escaping. For example, in a case in which a fugitive player acquires an invisibility item, under control of the display control unit 26 of the server 10, the fugitive character image associated with that fugitive player is not displayed on the UI unit 32 of the terminal device 12 of other users (for example, hunter players) for a predetermined amount of time. With this arrangement, the escaping of the fugitive character image becomes easy compared to the case in which the fugitive character image is displayed. For example, the escaping item is placed in a specific location in the virtual space, and a fugitive player is able to acquire an escaping item by moving in the real space to move the fugitive character image to that location. By placing the escaping item in a specific location, the fugitive player is motivated to move in the real space to acquire the escaping item. Obviously, an escaping item may also be acquired at a location that sells items in the virtual space. Note that even in a case in which a fugitive character image turns invisible, one's own invisible character image is still displayed on the UI unit 32 of the terminal device 12 of the fugitive player who acquired the invisibility item. The fugitive character image associated with the fugitive player who acquired the invisibility item may or may not be displayed on the UI unit 32 of the terminal device 12 of other fugitive players besides the fugitive player who acquired the invisibility item. The fugitive character image associated with the fugitive player who acquired the invisibility item may be displayed on the UI unit 32 of the terminal device 12 of other fugitive players belonging to the same fugitive team as the fugitive player who acquired the invisibility item. Also, the fugitive character images associated with other fugitive players belonging to the same fugitive team as the fugitive player who acquired the invisibility item may also be hidden.

An item may also be used by which capturing is not completed with a single capture. In a case in which a fugitive player acquires such an item, unless the fugitive character image associated with that fugitive player is captured multiple times, the capturing of that fugitive character image is not completed, and the fugitive player is still able to move. If capturing is not completed, points are not awarded to the hunter player. Information indicating whether or not capturing is completed with a single capture may or may not be displayed on the UI unit 32 of the terminal device 12 of other users (for example, hunter players).

A safe zone for taking refuge may also be provided in the virtual space, and if a fugitive character image enters the safe zone, capture by a hunter character image may be avoided for a predetermined time. After the predetermined time elapses, the fugitive character image may be forcibly ejected outside the safe zone. Hunter character images may also be unable to enter an area surrounding the safe zone (for example, within a predetermined range from the safe zone).

Attack items (such as a gun, for example) may also be used. By a user operation, a character image may attack another character image (for example, shooting an opponent with a gun), thereby causing the other character image to become unable to move in the virtual space for a predetermined time. The attack item may be usable only by fugitive players, usable only by hunter players, or usable by both fugitive players and hunter players. An attacked hunter character image may become unable to capture fugitive character images unless the hunter character image moves to a location for receiving healing (such as a hospital, for example) and receives healing.

Figure 8:
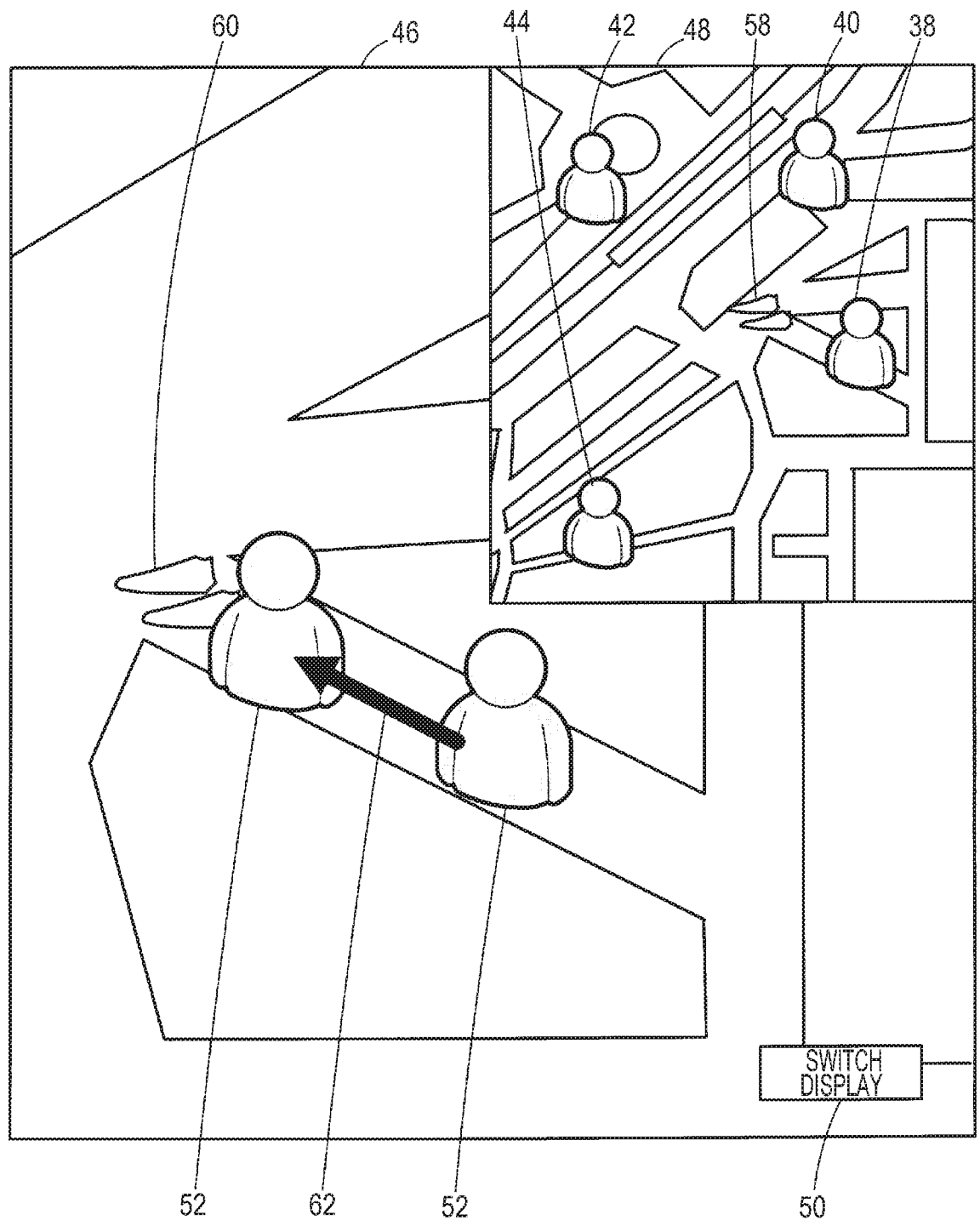
FIG. 8 is a diagram illustrating an example of a map.

FIG. 8 illustrates an example of an item. FIG. 8 illustrates the enlarged map 46 and the reduced map 48, similarly to FIGS. 6 and 7. Suppose that the enlarged map 46 and the reduced map 48 are being displayed on the UI unit 32 of the terminal device 12 of the user A. An item image 58 is displayed on the reduced map 48, while an item image 60 which is an enlargement of the item image 58 is displayed on the enlarged map 46. The item represented by the item image 58 (60) is a pair of shoes for increasing the movement speed of a character image, for example. For example, if the user A moves or operates the hunter character image 52 to move the hunter character image 52 as indicated by the arrow 62 and overlap with the item image 60, the item (shoes) can be acquired. With this arrangement, the movement speed of the hunter character image 52 in the virtual space becomes faster.

Figure 9:
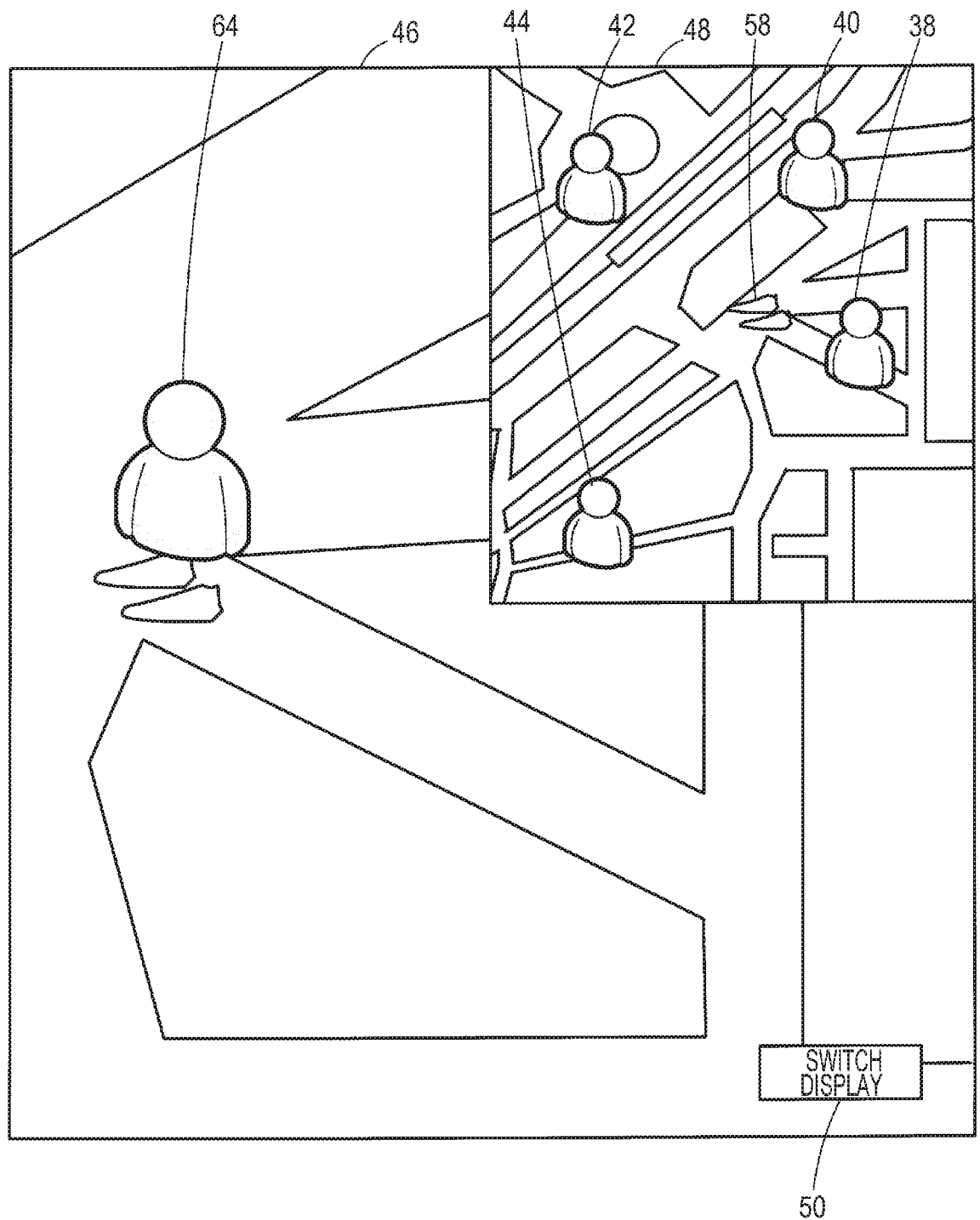
FIG. 9 is a diagram illustrating an example of a map.

FIG. 9 illustrates an example of a character image after acquiring an item. If the hunter character image 52 is made to overlap with the item image 60 and the item is acquired, the hunter character image changes under control of the display control unit 26 of the server 10. For example, as illustrated in FIG. 9, the hunter character image 52 changes, and a hunter character image 64 wearing a pair of shoes is displayed. Note that in the case in which the hunter character image 52 is an image representing a character already wearing a pair of shoes, when the item (shoes) is acquired, the portion of the image representing the original pair of shoes on the hunter character image 52 may be changed.

Figure 10:
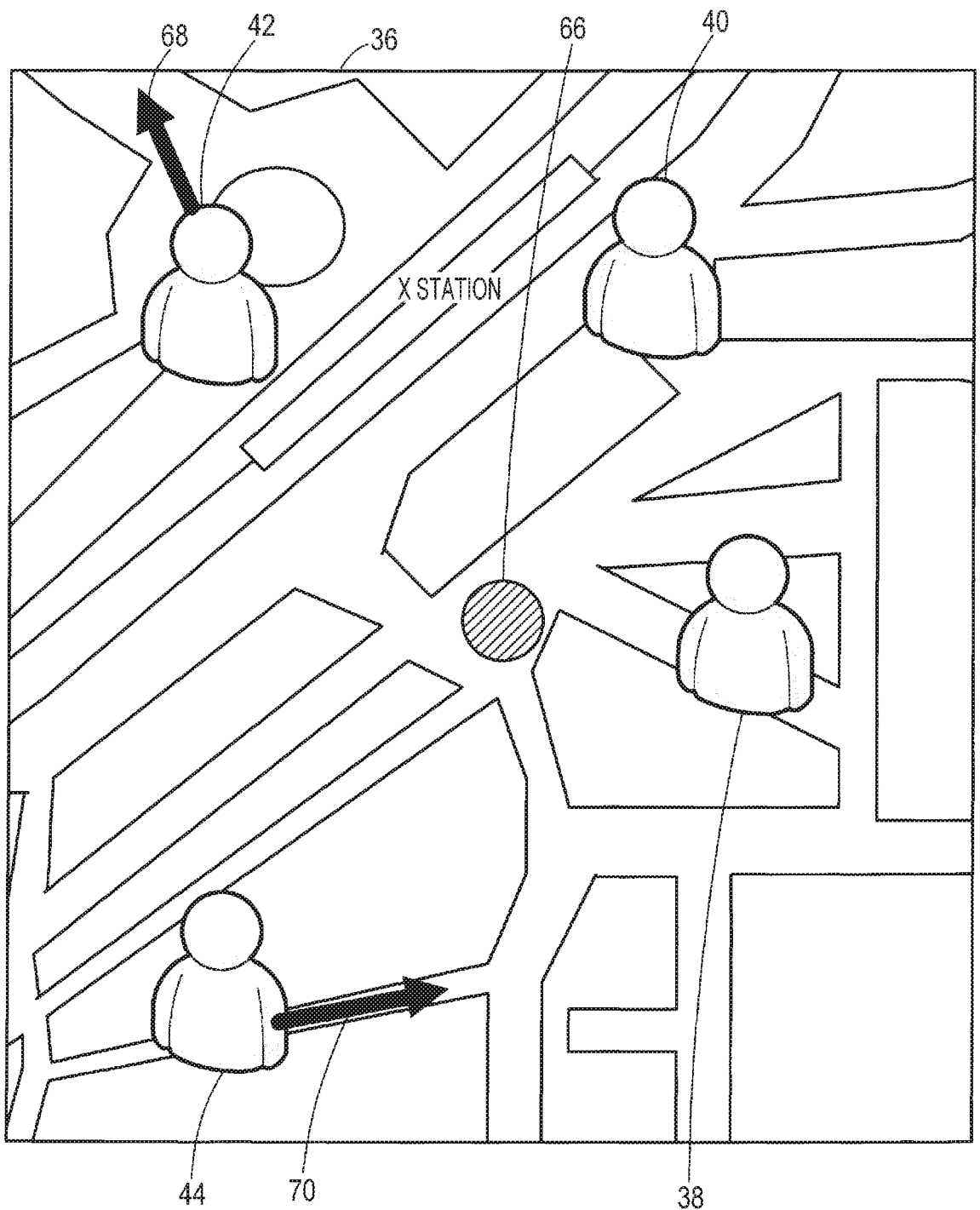
FIG. 10 is a diagram illustrating an example of a map.

FIG. 10 illustrates another example of a map. For example, a point acquisition location is placed in the virtual space, and on the map 36, an image 66 representing the point acquisition location is displayed. Points are awarded to a user if the character image passes through the image 66 representing the point acquisition location in the virtual space. The number of times a user is awarded points for passing through may be once per game, or one per a predetermined time, for example.

By having a character image pass through the image 66, the rate of point awarding to the user associated with that character image may also be changed. For example, passing through one time may cause the rate of point awarding to increase for the duration of one game, or to increase for a predetermined amount of time.

Information indicating the movement directions of character images associated with other users may also be displayed on the map being displayed on the UI unit 32 of one's own terminal device 12. For example, the control unit 22 of the server 10 predicts a user's movement direction, or in other words, the movement direction of the character image associated with that user, on the basis of the user's movement history (for example, the actual movement direction). To describe in terms of the example illustrated in FIG. 10, the map 36 is displayed on the UI unit 32 of the terminal device 12 of the user A, and on the map 36, information indicating the movement directions of character images associated with users other than the user A is displayed. For example, in a case in which the user A is participating in the game as a hunter player, information indicating the movement directions of the fugitive character images 42 and 44 are displayed on the map 36 being displayed on the UI unit 32 of the terminal device 12 of the user A. For example, the movement direction of the fugitive character image 42 is indicated by an arrow 68, while the movement direction of the fugitive character image 44 is indicated by an arrow 70. Obviously, information indicating the movement direction of the hunter character image 40 associated with the user B participating in the game as a hunter player similar to the user A may also be displayed on the map 36. As another example, information indicating the movement directions of character images associated with users belonging to the same team as the user A may be displayed, or information indicating the movement directions of character images associated with users belonging to a different team from the user A may be displayed.

On the map being displayed on the UI unit 32 of the terminal device 12 of a fugitive player, information (for example, an arrow) indicating the movement direction of a character image associated with a hunter player may also be displayed.

In a case in which a special condition is satisfied, such as a case in which a user acquires an item that displays information indicating the movement directions of the character images of other users, for example, information indicating the movement directions may be displayed, information indicating the movement directions may be displayed in accordance with an attribute of the user (for example, level), or information indicating the movement directions may be displayed in accordance with the points acquired by the user.

For example, in a case in which the user's level is at least a predetermined level (a level threshold), information indicating the movement directions of the character images of other users is displayed on the terminal device 12 of that user. As another example, in a case in which the points acquired by the user are at least a predetermined number of points (a point threshold), information indicating the movement directions of the character images of other users is displayed on the terminal device 12 of that user.

Note that in the case in which the movement of a hunter character image or a fugitive character images is controlled by an artificial intelligence, a hunter character image or a fugitive character image controlled by the artificial intelligence may appear at a specific position on the map, and the hunter character image or the fugitive character image may move on the map under control by the artificial intelligence.

A number of calories burned may also be calculated on the basis of a user's movement history (such as moved distance and movement speed). For example, the number of calories burned per game may be calculated. Information indicating the number of calories burned is displayed on the UI unit 32 of the terminal device 12. Also, the actual number of calories burned may be compared to a target number of calories predetermined by the user or a typical number of calories consumed (for example, the number of calories consumed in one day by an adult), and information indicating the comparison result may be displayed on the UI unit 32 of the terminal device 12. Also, on the basis of the number of calories burned per game, the number of games to participate in to burn the target number of calories or the typical number of calories consumed (for example, the remaining number of games one would have to participate in) may be calculated, and that number may be displayed on the UI unit 32 of the terminal device 12. The above calculation process and comparison process may be conducted by the control unit 22 of the server 10, or by the control unit 34 of the terminal device 12.

If the data regarding oneself (personal information) input by a user is detailed, more detailed information may be provided to the user. For example, in a case in which meal information indicating the content of a meal consumed by the user is input, a number of calories to be burned may be calculated on the basis of that information, and information such as the number of games to play and the distance to move may be calculated. Similarly, the number of games to play and the distance to move may be calculated in accordance with illness information indicating a current illness of the user, or an illness that the user wants to protect against. The moved distance when not participating in the game may also be measured by the terminal device 12 or a pedometer, and on the basis of this moved distance as well as the distance moved during the game, information such as the number of games to play and the distance to move in order to burn a target number of calories may be calculated. These calculation processes may be conducted by the control unit 22 of the server 10, or by the control unit 34 of the terminal device 12.

The above information, such as the number of calories burned, the comparison result, and the number of games to play, is presented to the user as information encouraging utilization of the game. This information is modified in accordance with the user's action history (movement history and meal history) as described above, and presented to the user.

In addition, the more detailed the above personal information is, more detailed information regarding the user's health is provided to the user, thus motivating the user to input personal information. In other words, the user is encouraged to input personal information through gamification. With this arrangement, a personal data store (PDS) is utilized proactively.

Note that by utilizing an information processing system according to the present exemplary embodiment, promotion of the user's health becomes possible in some cases, but obviously the information processing system according to the present exemplary embodiment may also be applied to a usage other than the promotion of the user's health.

Hereinafter, teams will be described in detail. The point awarding unit 20 may award points to a user in accordance with a team achievement. For example, the point awarding unit 20 assigns a ranking to each hunter team in accordance with the number of fugitive character images (fugitive players) that each hunter team has captured, and awards points to the users belonging to each hunter team in accordance with the ranking. A higher ranking is given to a hunter team with a greater number of captured fugitive character images, and more points are awarded. In addition, the point awarding unit 20 assigns a ranking to each fugitive team in accordance with the number of fugitive character images (fugitive players) not captured by each hunter team, and awards points to the users belonging to each fugitive team in accordance with the ranking. A higher ranking is given to a fugitive team with a greater number of fugitive character images which have not been captured, and more points are awarded. In addition, the point awarding unit 20 may also calculate the total distance moved by the users belonging to the same team, and award more points to teams with greater totals. In this way, by assigning a ranking to each team, multiple teams compete with each other, and the fun of the game is increased.

The point awarding unit 20 may also award points to users belonging to a numerically inferior team in accordance with a more favorable point awarding condition than users belonging to a numerically superior team. A numerically inferior team is a team with fewer users than other teams participating in the game, a team with users of a lower level (total levels) than other teams, or the like, for example. The team with the fewest number of users or the team with users of the lowest level (total) may be registered as a numerically inferior team, or multiple teams from the lowest ranking in terms of number of users or level (total) up to a predetermined low ranking may be registered as numerically inferior teams. A numerically superior team is a team other than a numerically inferior team, for example. The favorable point awarding condition may be, for example, increasing a point multiplier, or awarding special points. The point awarding unit 20 may award special points to users who already belong to or who have newly joined a numerically inferior team, or the point awarding unit 20 may increase a point multiplier by which to award points to such users. By giving preferential treatment to numerically inferior teams in this way, the balance of power between numerically inferior teams and numerically superior teams can be equalized, and the fun of the game is increased. Also, since the number of users wanting to join a numerically inferior team is expected to increase, the balance of power between numerically inferior teams and numerically superior teams can be equalized.

The management unit 24 may also change the attributes of the character images associated with users belonging to a team, in accordance with the points acquired by that team. For example, as the points acquired by a team increase, the management unit 24 may raise the movement performance of the character images associated with the users belonging to that team, increase the size of hunter character images associated with hunter players belonging to a hunter team, decrease the size of fugitive character images associated with fugitive players belonging to a fugitive team, or raise the maneuverability of the character images. With this arrangement, as the points acquired by a team increase, the team becomes able to proceed more favorably, thereby motivating users to actively participate in the game and acquire points.

As another example, as the points acquired by a team increase, the management unit 24 may lower the movement performance of each character image associated with each user belonging to that team, decrease the size of each hunter character image associated with each hunter player belonging to a hunter team, increase the size of each fugitive character image associated with each fugitive player belonging to a fugitive team, or lower the maneuverability of each character image associated with each user belonging to that team. With this arrangement, a handicap is imposed on teams that have acquired more points, and thus the balance of power among multiple teams can be equalized, and the fun of the game is increased.

The management unit 24 may also change the attributes of each character image associated with each user belonging to a team, in accordance with the number of users belonging to the same team. For example, for a team containing a greater number of users, the management unit 24 may lower the movement performance of each character image associated with each user belonging to that team, decrease the size of each hunter character image associated with each hunter player belonging to a hunter team, increase the size of each fugitive character image associated with each fugitive player belonging to a fugitive team, or lower the maneuverability of each character image associated with each user belonging to that team. With this arrangement, imbalances of power due to the numbers of users among respective teams are addressed, and the fun of the game is increased.

Hereinafter, exemplary modifications will be described.

(Exemplary Modification 1)

Figure 11:
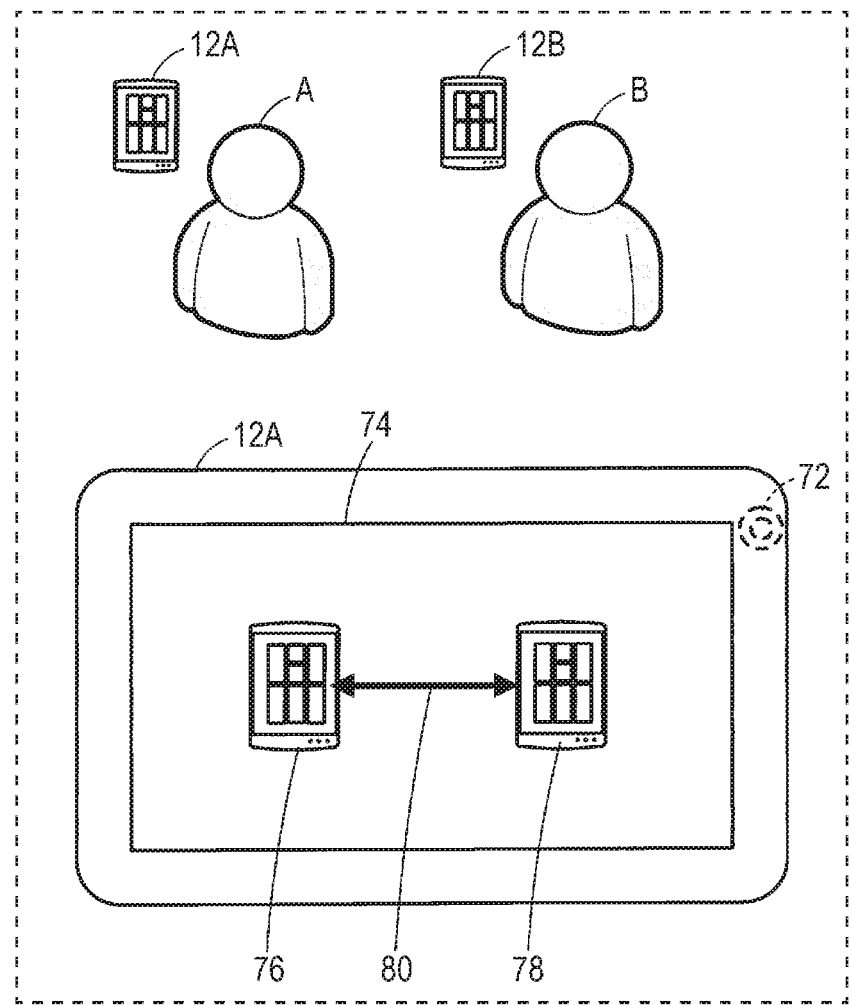
FIG. 11 is a diagram illustrating a screen according to Exemplary Modification 1.
Figure 12:
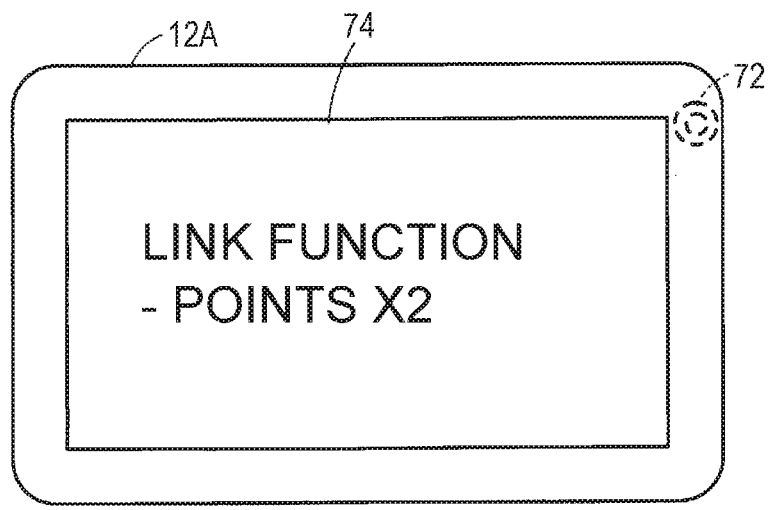
FIG. 12 is a diagram illustrating a screen according to Exemplary Modification 1.

Exemplary Modification 1 will be described with reference to FIGS. 11 and 12. FIGS. 11 and 12 illustrate screens on a terminal device and the like. For example, suppose that the users A and B are participating in the game and belong to the same team. In this case, points may be awarded to the users A and B in accordance with a link between the users A and B. For example, suppose that the user A possesses a terminal device 12A, while the user B possesses a terminal device 12B. The configuration of the terminal devices 12A and 12B is provided with the configuration of the terminal device 12 illustrated in FIG. 3, as well as a camera 72 that acts as an imaging unit.

For example, in a case in which the user A uses the camera 72 of the terminal device 12A to take an image as a piece of equipment to link with the terminal device 12B of the user B, a screen 74 is displayed on the UI unit 32 of the terminal device 12A, and equipment images 76 and 78 are displayed on the screen 74. The equipment image 76 is an image associated with the terminal device 12A, and is stored in advance in the storage unit 16 of the terminal device 12A. The equipment image 78 is an image associated with the terminal device 12B. The equipment images 76 and 78 may be images generated by taking images of the terminal devices 12A and 12B with a camera, or images that represent the terminal devices 12A and 12B diagrammatically (for example, icons). If the user A performs an operation of joining the equipment image 76 and the equipment image 78 on the screen 74 as indicated by the arrow 80, the terminal devices 12A and 12B are identified as equipment to be linked together (equipment to be paired). In this case, by executing the link function, the rate of point awarding for the users A and B is changed. For example, as illustrated in FIG. 12, information indicating the link function (for example, "Points x2") is displayed on the screen 74. Information indicating the link function is also displayed on the terminal device 12B of the user B. Note that the above recognition process may be conducted by the control unit 22 of the server 10, or by the terminal device 12A.

(Exemplary Modification 2)

Figure 13:
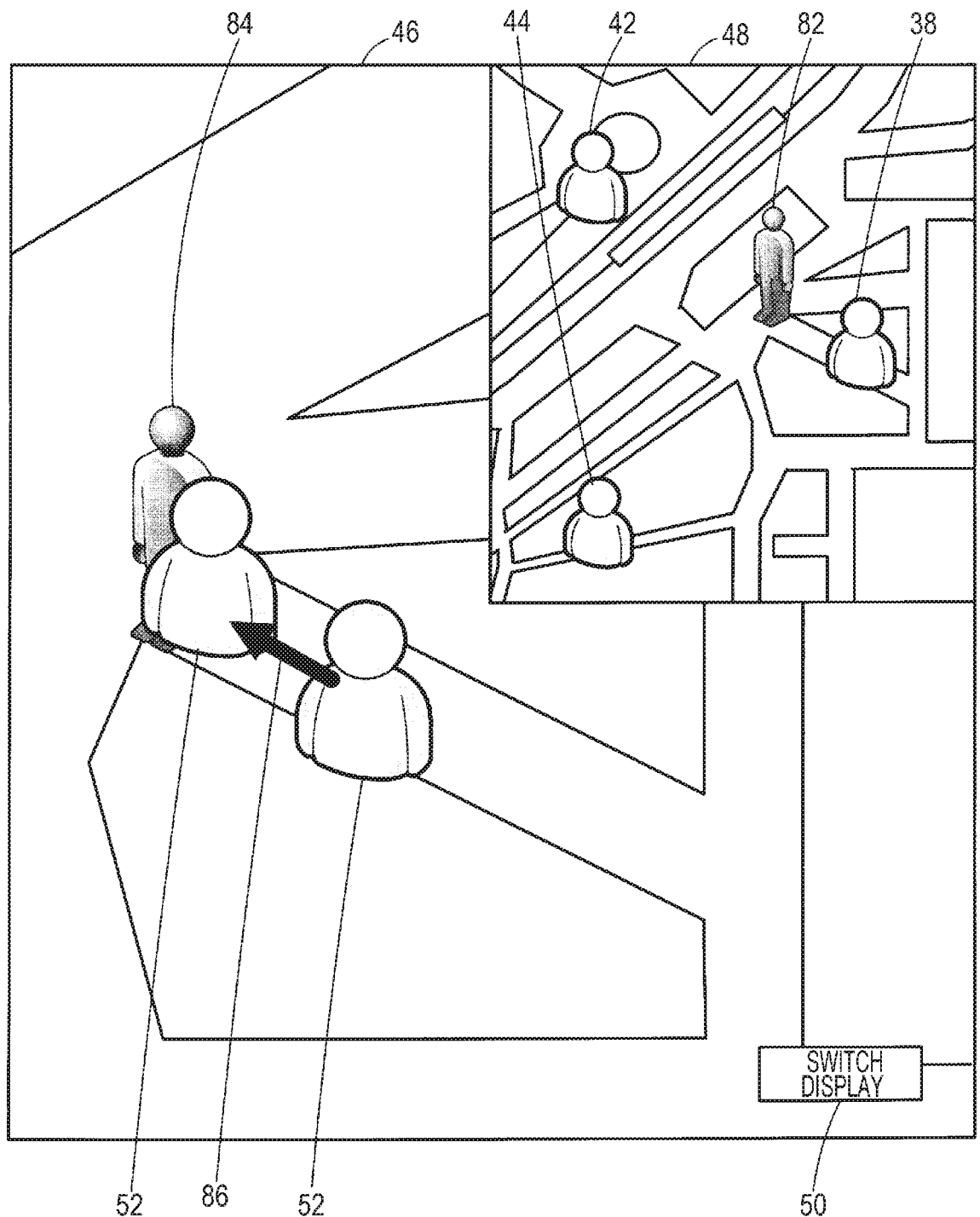
FIG. 13 is a diagram illustrating a map according to Exemplary Modification 2.
Figure 14:
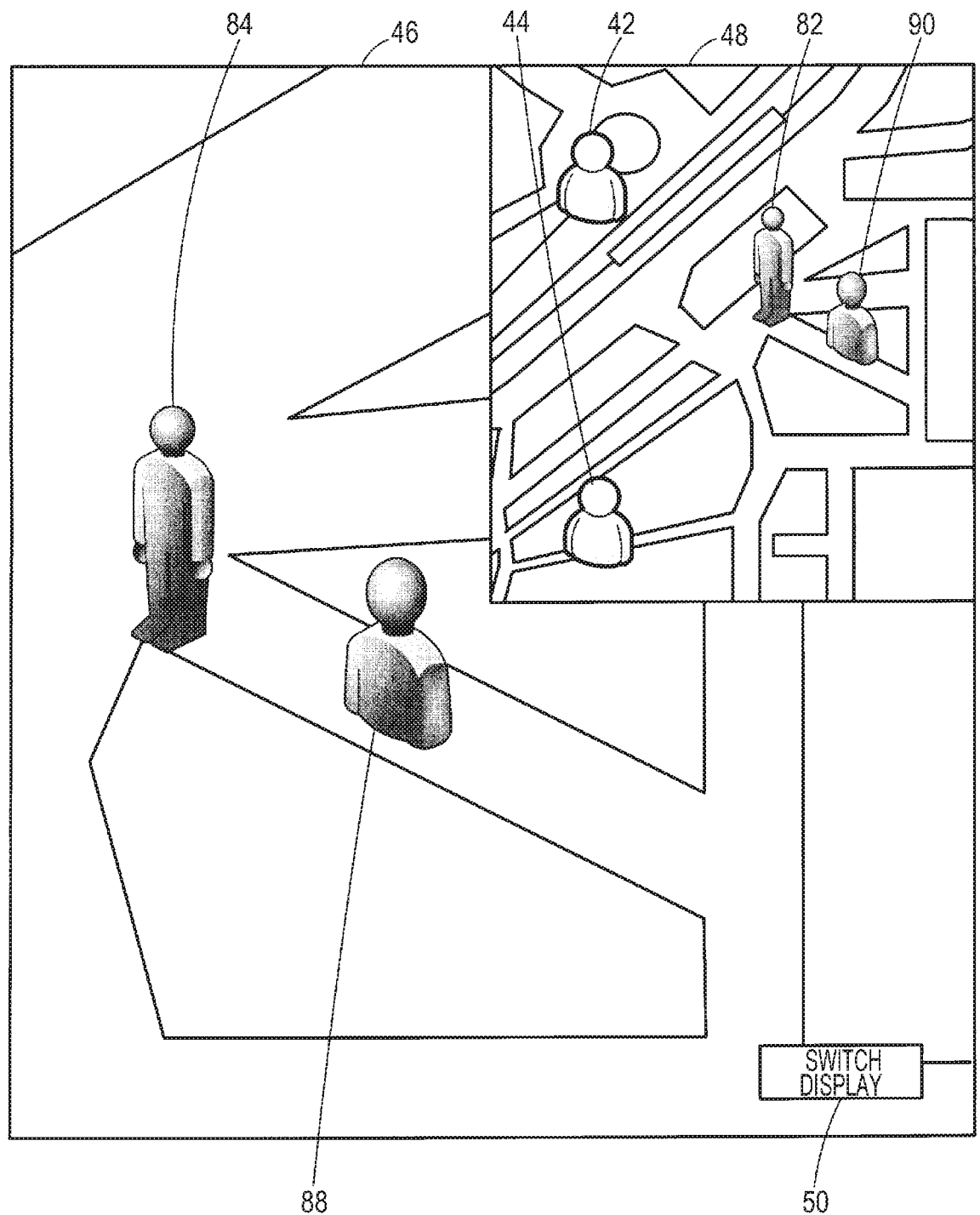
FIG. 14 is a diagram illustrating a map according to Exemplary Modification 2.

Exemplary Modification 2 will be described with reference to FIGS. 13 and 14. FIGS. 13 and 14 illustrate the enlarged map 46 and the reduced map 48. Suppose that these maps are being displayed on the UI unit 32 of the terminal device 12 of the user A acting as a hunter player, for example. A hunter character image 82 associated with a user E acting as a hunter player is displayed on the reduced map 48, while a hunter character image 84 associated with the user E (an enlarged image of the hunter character image 82) is displayed on the enlarged map 46.

In Exemplary Modification 2, the attributes of a character image (such as movement performance, size, or maneuverability) are changed in accordance with the overlapping of multiple character images.

Hereinafter, a case in which the movement performance of a character image is changed will be described. By having multiple character images with different movement performances overlap each other, the movement performance of a character image is changed. For example, in a case in which a character image with low movement performance associated with a user of the same type as a user associated with a character image with high movement performance is overlapped onto the character image with high movement performance, the management unit 24 raises the movement performance of the character image with low movement performance. Specifically, in a case in which a hunter character image with low movement performance is overlapped onto a hunter character image with high movement performance, the management unit 24 raises the movement performance of the hunter character image with low movement performance. Similarly, in a case in which a fugitive character image with low movement performance is overlapped onto a fugitive character image with high movement performance, the management unit 24 raises the movement performance of the fugitive character image with low movement performance.

The management unit 24 may raise the movement performance of a character image with low movement performance temporarily (for example, for a predetermined amount of time), set the movement performance of the character image with low movement performance to the same movement performance as the character image with high movement performance, or raise the movement performance of the character image with low movement performance by a predetermined value.

To describe in terms of the example illustrated in FIG. 13, suppose that the hunter character image 52 (38) associated with the user A has low movement performance, while the hunter character image 84 (82) associated with the user E has high movement performance. By having the user A move or operate the hunter character image 52 to move the hunter character image 52 as indicated by the arrow 86 and overlap with the hunter character image 84 associated with the user E, the management unit 24 raises the movement performance of the hunter character image 52 associated with the user A. The management unit 24 may raise the movement performance of the hunter character image 52 temporarily, set the movement performance of the hunter character image 52 to the same movement performance as the hunter character image 84, or raise the movement performance of the hunter character image 52 by a predetermined value. Note that the hunter character images 52 and 84 become operable by users in a case in which the distance between the hunter character image 52 and the hunter character image 84 becomes less than or equal to a distance threshold, for example.

In a case in which the movement performance of the character image 52 (38) associated with the user A is raised, the display control unit 26 changes the character image associated with the user A, and causes the UI unit 32 of the terminal device 12 to display the changed character image. The changed character image is illustrated in FIG. 14. The character image 88 displayed on the enlarged map 46 is the changed image of the character image 52, while the character image 90 displayed on the reduced map 48 is the changed image of the hunter character image 38.

Note that the management unit 24 may also raise the movement performance of character images in a case in which multiple character images belonging to the same team are overlapped with each other. For example, in a case in which a character image with low movement performance associated with a user belonging to the same team as another user associated with a character image with high movement performance is overlapped onto the character image with high movement performance, the management unit 24 raises the movement performance of the character image with low movement performance. Specifically, in a case in which a hunter character image with low movement performance associated with a hunter player belonging to the same hunter team as another hunter player associated with a hunter character image with high movement performance is overlapped onto the hunter character image with high movement performance, the management unit 24 raises the movement performance of the hunter character image with low movement performance. Similarly, in a case in which a fugitive character image with low movement performance associated with a fugitive player belonging to the same fugitive team as another fugitive player associated with a fugitive character image with high movement performance is overlapped onto the fugitive character image with high movement performance, the management unit 24 raises the movement performance of the fugitive character image with low movement performance. Obviously, in a case in which a character image with low movement performance associated with a user belonging to a different team as another user associated with a character image with high movement performance is overlapped onto the character image with high movement performance, the management unit 24 may also raise the movement performance of the character image with low movement performance.

As another example, in a case in which a character image with high movement performance is overlapped onto a character image with low movement performance, the management unit 24 may raise the movement performance of the character image with low movement performance.

In a case in which a character image with high movement performance associated with a user belonging to the same team as another user associated with a character image with low movement performance is overlapped onto the character image with low movement performance, the management unit 24 may also raise the movement performance of the character image with low movement performance. For example, in a case in which a hunter character image with high movement performance associated with a hunter player belonging to the same hunter team as another hunter player associated with a hunter character image with low movement performance is overlapped onto the hunter character image with low movement performance, the management unit 24 raises the movement performance of the hunter character image with low movement performance. Similarly, in a case in which a fugitive character image with high movement performance associated with a fugitive player belonging to the same fugitive team as another fugitive player associated with a fugitive character image with low movement performance is overlapped onto the fugitive character image with low movement performance, the management unit 24 raises the movement performance of the fugitive character image with low movement performance. Obviously, in a case in which a character image with high movement performance associated with a user belonging to a different team as another user associated with a character image with low movement performance is overlapped onto the character image with low movement performance, the management unit 24 may also raise the movement performance of the character image with low movement performance.

As another example, the management unit 24 may also lower the movement performance of character images in a case in which multiple character images belonging to different teams are overlapped with each other. For example, in a case in which a character image with low movement performance associated with a user belonging to a different team as another user associated with a character image with high movement performance is overlapped onto the character image with high movement performance, the management unit 24 may also lower the movement performance of the character image with high movement performance. Specifically, in a case in which a hunter character image with low movement performance associated with a hunter player belonging to a different hunter team as another hunter player associated with a hunter character image with high movement performance is overlapped onto the hunter character image with high movement performance, the management unit 24 lowers the movement performance of the hunter character image with high movement performance. Similarly, in a case in which a fugitive character image with low movement performance associated with a fugitive player belonging to a different fugitive team as another fugitive player associated with a fugitive character image with high movement performance is overlapped onto the fugitive character image with high movement performance, the management unit 24 lowers the movement performance of the fugitive character image with high movement performance. With this arrangement, the power of another team can be reduced. The management unit 24 may lower the movement performance of a character image with high movement performance temporarily, set the movement performance of the character image with high movement performance to the same movement performance as the character image with low movement performance, or lower the movement performance of the character image with high movement performance by a predetermined value.

As another example, in a case in which a fugitive character image is overlapped onto a hunter character image, the management unit 24 may lower the movement performance of the hunter character image. With this arrangement, capturing a fugitive character image becomes more difficult, and the fugitive player escapes more easily.

Hereinafter, a case in which the size of a character image is changed will be described. By having multiple character images with different sizes overlap each other, the size of a character image is changed. For example, in a case in which a small hunter character image is overlapped onto a large hunter character image, the management unit 24 increases the size of the small hunter character image. With this arrangement, capturing a fugitive character image becomes easier compared to the case in which the size of the hunter character image is small. Also, in a case in which a large fugitive character image is overlapped onto a small fugitive character image, the management unit 24 decreases the size of the large fugitive character image. With this arrangement, capturing a fugitive character image becomes more difficult compared to the case in which the size of the fugitive character image is large, and the fugitive player escapes more easily.

The management unit 24 may change the size of a character image temporarily, set the size of the character image overlapped onto another character image to the same size as the size of the other character image, or increase or decrease the size of a character image by a predetermined value.

Note that the management unit 24 may also change the size of character images in a case in which multiple character images belonging to the same team are overlapped with each other. For example, in a case in which a small hunter character image associated with a hunter player belonging to the same hunter team as another hunter player associated with a large hunter character image is overlapped onto the large hunter character image, the management unit 24 increases the size of the small hunter character image. Also, in a case in which a large fugitive character image associated with a fugitive player belonging to the same fugitive team as another fugitive player associated with a small fugitive character image is overlapped onto the small fugitive character image, the management unit 24 decreases the size of the large fugitive character image. Obviously, in a case in which a character image associated with a user belonging to a different team as another user associated with another character image is overlapped onto the other character image, the management unit 24 may also change the size of the character image.

As another example, in a case in which another character image is overlapped onto a character image, the management unit 24 may change the size of the character image. For example, in a case in which a large hunter character image is overlapped onto a small hunter character image, the management unit 24 increases the size of the small hunter character image. Also, in a case in which a small fugitive character image is overlapped onto a large fugitive character image, the management unit 24 decreases the size of the large fugitive character image.

In a case in which a large hunter character image associated with a hunter player belonging to the same hunter team as another hunter player associated with a small hunter character image is overlapped onto the small hunter character image, the management unit 24 may increase the size of the small hunter character image. Also, in a case in which a small fugitive character image associated with a fugitive player belonging to the same fugitive team as another fugitive player associated with a large fugitive character image is overlapped onto the large fugitive character image, the management unit 24 may decrease the size of the large fugitive character image. Obviously, in a case in which a character image associated with a user belonging to a different team as another user associated with another character image is overlapped onto the other character image, the management unit 24 may also change the size of the other character image.

As another example, the management unit 24 may also lower a capability related to the size of character images in a case in which multiple character images belonging to different teams are overlapped with each other. For example, in a case in which a small hunter character image associated with a hunter player belonging to a different hunter team as another hunter player associated with a large hunter character image is overlapped onto the large hunter character image, the management unit 24 decreases the size of the large hunter character image. Also, in a case in which a large fugitive character image associated with a fugitive player belonging to a different fugitive team as another fugitive player associated with a small fugitive character image is overlapped onto the small fugitive character image, the management unit 24 increases the size of the small fugitive character image. With this arrangement, the power of another team can be reduced.

As another example, in a case in which a fugitive character image is overlapped onto a hunter character image, the management unit 24 may decrease the size of the hunter character image. With this arrangement, capturing a fugitive character image becomes more difficult, and the fugitive player escapes more easily.

Hereinafter, a case in which the maneuverability of a character image is changed will be described. By having multiple character images with different maneuverability overlap each other, the maneuverability of a character image is changed. For example, in a case in which a character image with low maneuverability associated with a user of the same type as a user associated with a character image with high maneuverability is overlapped onto the character image with high maneuverability, the management unit 24 raises the maneuverability of the character image with low maneuverability. Specifically, in a case in which a hunter character image with low maneuverability is overlapped onto a hunter character image with high maneuverability, the management unit 24 raises the maneuverability of the hunter character image with low maneuverability. Similarly, in a case in which a fugitive character image with low maneuverability is overlapped onto a fugitive character image with high maneuverability, the management unit 24 raises the maneuverability of the fugitive character image with low maneuverability.

The management unit 24 may raise the maneuverability of a character image with low maneuverability temporarily, set the maneuverability of the character image with low maneuverability to the same maneuverability as the character image with high maneuverability, or raise the maneuverability of the character image with low maneuverability by a predetermined value.

Note that the management unit 24 may also raise the maneuverability of character images in a case in which multiple character images belonging to the same team are overlapped with each other. For example, in a case in which a character image with low maneuverability associated with a user belonging to the same team as another user associated with a character image with high maneuverability is overlapped onto the character image with high maneuverability, the management unit 24 raises the maneuverability of the character image with low maneuverability. Specifically, in a case in which a hunter character image with low maneuverability associated with a hunter player belonging to the same hunter team as another hunter player associated with a hunter character image with high maneuverability is overlapped onto the hunter character image with high maneuverability, the management unit 24 raises the maneuverability of the hunter character image with low maneuverability. Similarly, in a case in which a fugitive character image with low maneuverability associated with a fugitive player belonging to the same fugitive team as another fugitive player associated with a fugitive character image with high maneuverability is overlapped onto the fugitive character image with high maneuverability, the management unit 24 raises the maneuverability of the fugitive character image with low maneuverability. Obviously, in a case in which a character image with low maneuverability associated with a user belonging to a different team as another user associated with a character image with high maneuverability is overlapped onto the character image with high maneuverability, the management unit 24 may also raise the maneuverability of the character image with low maneuverability.

As another example, in a case in which a character image with high maneuverability is overlapped onto a character image with low maneuverability, the management unit 24 may raise the maneuverability of the character image with low maneuverability.

In a case in which a character image with high maneuverability associated with a user belonging to the same team as another user associated with a character image with low maneuverability is overlapped onto the character image with low maneuverability, the management unit 24 may also raise the maneuverability of the character image with low maneuverability. For example, in a case in which a hunter character image with high maneuverability associated with a hunter player belonging to the same hunter team as another hunter player associated with a hunter character image with low maneuverability is overlapped onto the hunter character image with low maneuverability, the management unit 24 raises the maneuverability of the hunter character image with low maneuverability. Similarly, in a case in which a fugitive character image with high maneuverability associated with a fugitive player belonging to the same fugitive team as another fugitive player associated with a fugitive character image with low maneuverability is overlapped onto the fugitive character image with low maneuverability, the management unit 24 raises the maneuverability of the fugitive character image with low maneuverability. Obviously, in a case in which a character image with high maneuverability associated with a user belonging to a different team as another user associated with a character image with low maneuverability is overlapped onto the character image with low maneuverability, the management unit 24 may also raise the maneuverability of the character image with low maneuverability.

As another example, the management unit 24 may also lower the maneuverability of character images in a case in which multiple character images belonging to different teams are overlapped with each other. For example, in a case in which a character image with low maneuverability associated with a user belonging to a different team as another user associated with a character image with high maneuverability is overlapped onto the character image with high maneuverability, the management unit 24 may also lower the maneuverability of the character image with high maneuverability. Specifically, in a case in which a hunter character image with low maneuverability associated with a hunter player belonging to a different hunter team as another hunter player associated with a hunter character image with high maneuverability is overlapped onto the hunter character image with high maneuverability, the management unit 24 lowers the maneuverability of the hunter character image with high maneuverability. Similarly, in a case in which a fugitive character image with low maneuverability associated with a fugitive player belonging to a different fugitive team as another fugitive player associated with a fugitive character image with high maneuverability is overlapped onto the fugitive character image with high maneuverability, the management unit 24 lowers the maneuverability of the fugitive character image with high maneuverability. With this arrangement, the power of another team can be reduced. The management unit 24 may lower the maneuverability of a character image with high maneuverability temporarily, set the maneuverability of the character image with high maneuverability to the same maneuverability as the character image with low maneuverability, or lower the maneuverability of the character image with high maneuverability by a predetermined value.

As another example, in a case in which a fugitive character image is overlapped onto a hunter character image, the management unit 24 may lower the maneuverability of the hunter character image. With this arrangement, capturing a fugitive character image becomes more difficult, and the fugitive player escapes more easily.

(Exemplary Modification 3)

Figure 15:
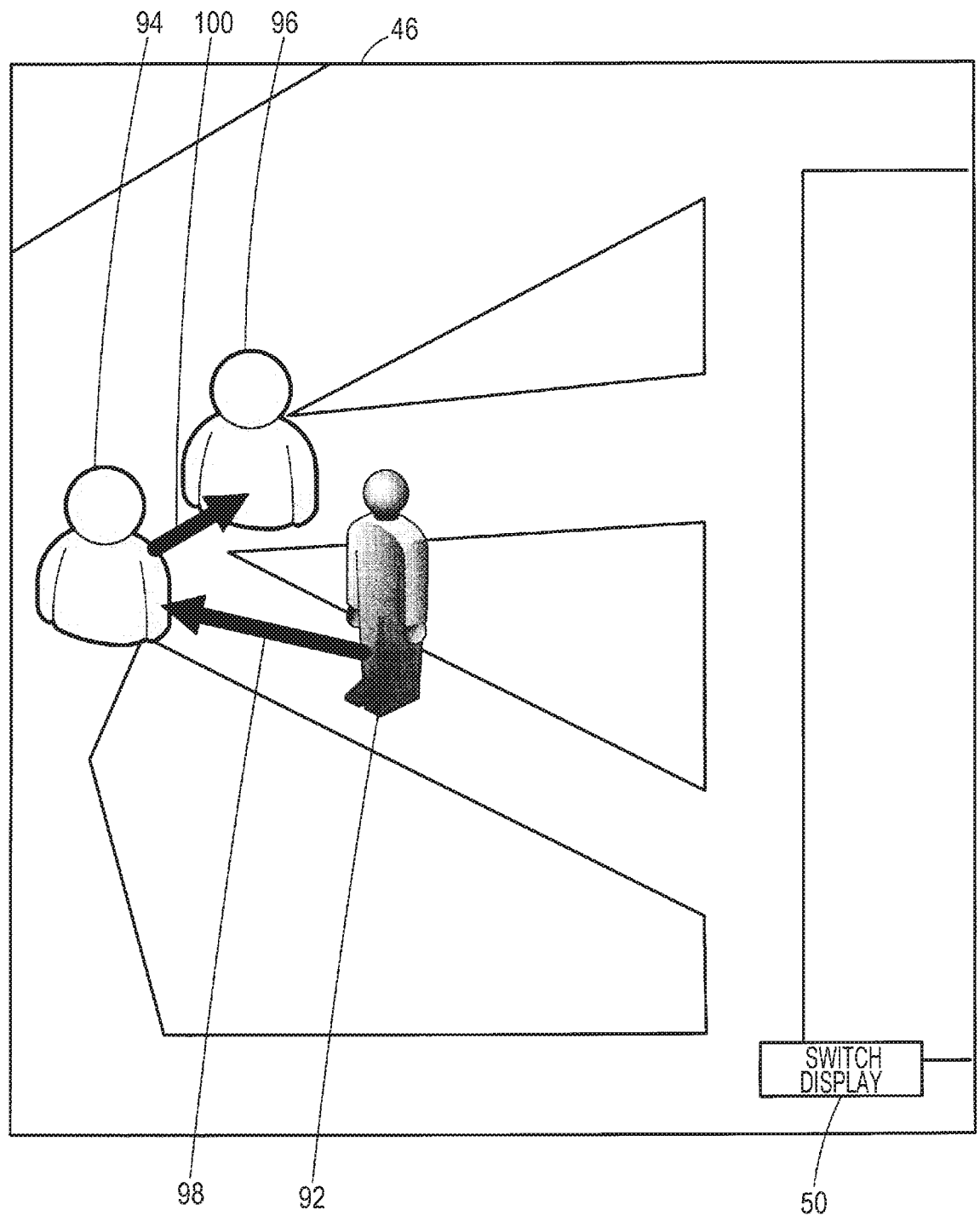
FIG. 15 is a diagram illustrating a map according to Exemplary Modification 3.
Figure 16:
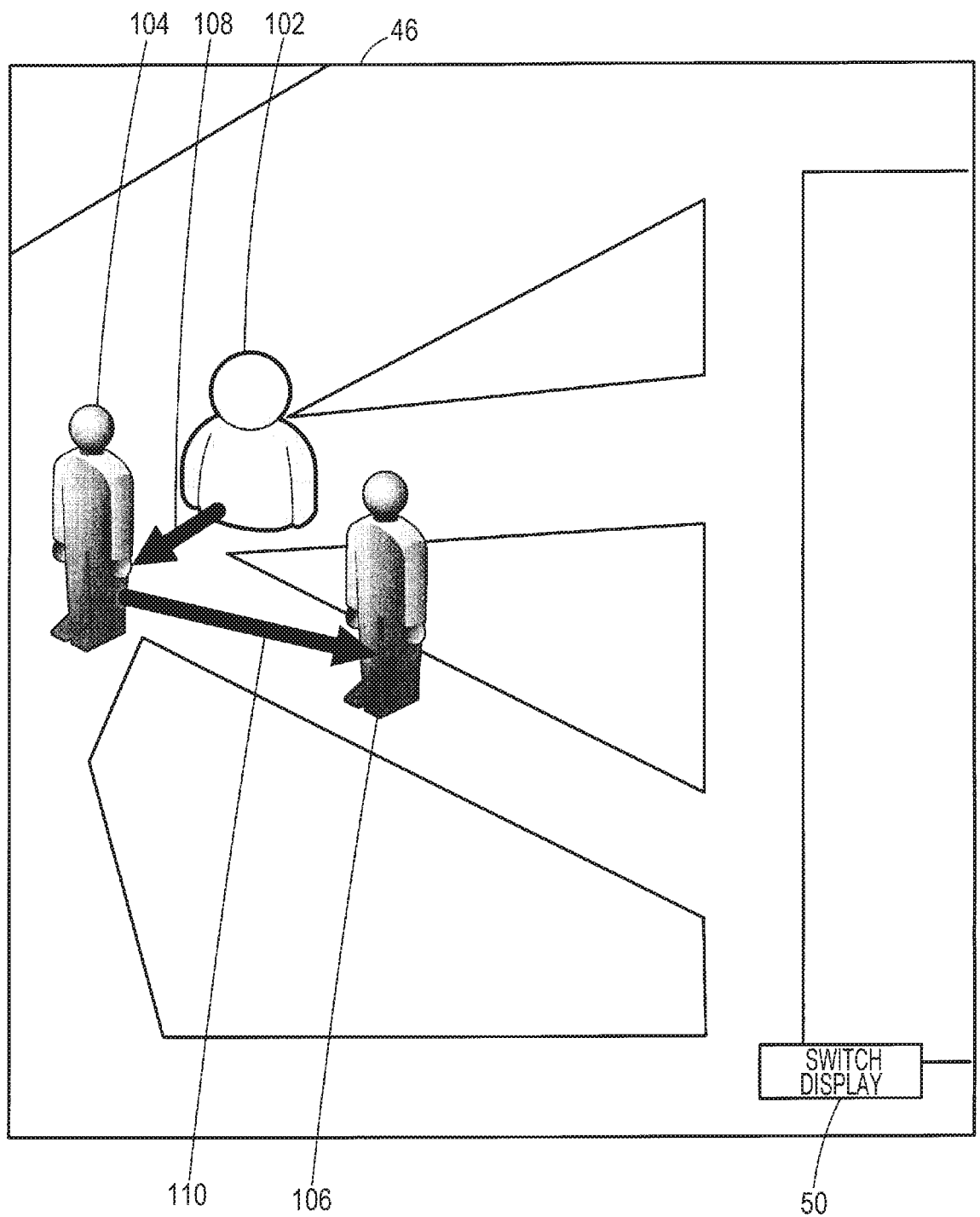
FIG. 16 is a diagram illustrating a map according to Exemplary Modification 3.

Exemplary Modification 3 will be described with reference to FIGS. 15 and 16. FIGS. 15 and 16 illustrate the enlarged map 46. In Exemplary Modification 3, the attributes of a character image (such as movement performance, size, or maneuverability) are changed in accordance with the order of overlapping of multiple character images.

Hereinafter, a case in which the movement performance of a character image is changed will be described. On the enlarged map 46 illustrated in FIG. 15, hunter character images 92, 94, and 96 are displayed. Suppose that the hunter character image 92 has high movement performance, while the hunter character images 94 and 96 have low movement performance. In this case, suppose that the hunter character image 92 is overlapped onto the hunter character image 94 as indicated by the arrow 98, and in addition, the hunter character image 92 is overlapped onto the hunter character image 96 as indicated by the arrow 100. In this case, the management unit 24 raises the movement performance of the hunter character images 94 and 96 that were overlapped consecutively by the hunter character image 92 with high movement performance. The case of overlapping multiple fugitive character images is the same.

FIG. 16 illustrates another example. On the enlarged map 46 illustrated in FIG. 16, hunter character images 102, 104, and 106 are displayed. Suppose that the hunter character image 102 has low movement performance, while the hunter character images 104 and 106 have high movement performance. In this case, suppose that the hunter character image 102 is overlapped onto the hunter character image 104 as indicated by the arrow 108, and in addition, the hunter character image 102 is overlapped onto the hunter character image 106 as indicated by the arrow 110. In this case, the management unit 24 lowers the movement performance of the hunter character images 104 and 106 that were overlapped consecutively by the hunter character image 102 with low movement performance. The case of overlapping multiple fugitive character images is the same.

As another example, the management unit 24 may also change the movement performance of each character image in accordance with the order of overlapping of multiple character images belonging to the same team (for example, the same hunter team, or the same fugitive team).

In the above example, the movement performance of character images is changed, but the management unit 24 may also change the size of each character image or change the maneuverability of each character image in accordance with the order of overlapping of multiple character images.

The game according to the exemplary embodiment and exemplary modifications described above is merely one example. As another example, multiple character images associated with multiple users may move to a specific location in a virtual space, or multiple users may move to a specific location in a real space, and at the specific location, if the character image associated with a user is overlapped onto or joined to a character image associated with another user, the user or the other user may be awarded points. The present exemplary embodiment may be applied to a service that awards points to a user or another user by utilizing character images (the user's own character image and the other user's character image) and position information (the user's own position information and the other user's position information).

Each of the server 10 and the terminal device 12 above is realized by the cooperative action of hardware and software as an example. Specifically, each of the server 10 and the terminal device 12 is provided with one or multiple processors such as CPUs (not illustrated). By having the one or multiple processors load and execute a program stored in a storage device (not illustrated), the functions of the respective units of the server 10 and the terminal device 12 are realized. The program is stored in the storage device via a recording medium such as a CD or DVD, or alternatively, via a communication link such as a network. As another example, the respective units of each of the server 10 and the terminal device 12 may be realized by hardware resources such as a processor, an electronic circuit, or an application-specific integrated circuit (ASIC), for example. A device such as memory may also be used in such a realization. As yet another example, the respective units of each of the server 10 and the terminal device 12 may also be realized by a digital signal processor (DSP), a field-programmable gate array (FPGA), or the like.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device, comprising:
   a controller configured to:
   control display, in a virtual space, of a first character image on a map of a real space, in accordance with a position of a first user in the real space; and
   in response to a distance in the virtual space between the first character image and a second character image of a second user being less than or equal to a first distance, enter an operation mode enabling an operation of the first character image by the first user,
   wherein the operation of the first character image by the first user comprises an interaction with an interface of the information processing device to move the first character image along streets displayed on the map of the real space, and wherein in the operation mode, the first character image in the virtual space is movable within a predetermined range that is less than or equal to a second distance away from a position of the first character image before entering the operation mode.

2. The information processing device according to claim 1, wherein the controller is further configured to, in response to entering the operation mode, enable the operation of the second character image by the second user.

3. The information processing device according to claim 2, wherein the operation of the first character image comprises moving the first character image by a first unit distance along the streets displayed on the map.

4. The information processing device according to claim 3, wherein the operation of the second character image comprises moving the second character image by a second unit distance along the streets displayed on the map, the second unit distance being different from the first unit distance.

5. The information processing device according to claim 2, wherein in the operation mode, the controller is further configured to enable the operation of the first character image on a terminal device of the first user.

6. The information processing device according to claim 5, wherein in the operation mode, the controller is further configured to enable the operation of the second character image on a second terminal device of the second user.

7. The information processing device according to claim 1, wherein in the operation mode, the second character image in the virtual space is movable in a predetermined range that is less than or equal to a third distance away from a position of the second character image before entering the operation mode, the third distance being different from the second distance.

8. The information processing device according to claim 1, wherein the operation of the first character image comprises moving the first character image by a first unit distance along the streets displayed on the map.

9. The information processing device according to claim 8, wherein in the operation mode, the controller is further configured to adjust the first unit distance according to a virtual item possessed by the first user.

10. The information processing device according to claim 1, wherein in the operation mode, the controller is further configured to adjust the movable range of the first character image according to a virtual item possessed by the first user.

11. The information processing device according to claim 1, wherein in the operation mode, the controller is further configured to enable the operation of the first character image on a terminal device of the first user.

12. The information processing device according to claim 1, wherein the controller is further configured to cancel the operation mode to disable the operation of the first character image in response to the distance in the virtual space between the first character image and second character image of second user being greater than the first distance.

13. The information processing device according to claim 1, wherein the controller is further configured to, in response to entering the operation mode, display the first character image on an enlarged map,
wherein a scale of the enlarged map is greater than a scale of the map.

14. The information processing device according to claim 1, wherein the controller is further configured to, in response to entering the operation mode, display simultaneously the first character image on the map and on an enlarged map, wherein a scale of the enlarged map is greater than a scale of the map.

15. The information processing device according to claim 1, wherein the controller is further configured to, in response to the distance in the virtual space between the first character image and the second character image being greater than the first distance, refrain from entering the operation mode such that the operation of the first character image by the first user is disabled.

16. The information processing device according to claim 1, wherein the interaction with the interface comprises contacting a screen of the information processing device with a stylus or a finger of the first user and using the stylus or the finger of the first user to trace a line across the screen to move the first character image.

17. A terminal device, comprising:
a display; and
a controller configured to:
control the display to display, in a virtual space, a first character image on a map of a real space, in accordance with a position of the terminal device in the real space; and
in response to a distance in the virtual space between the first character image and a second character image corresponding to a second terminal device being less than or equal to a first distance, enter an operation mode enabling an operation of the first character image by the terminal device,
wherein the operation of the first character image comprises an interaction with an interface of the terminal device to move the first character image along streets displayed on the map of the real space, and
wherein in the operation mode, the first character image in the virtual space is movable within a predetermined range that is less than or equal to a second distance away from a position of the first character image before entering the operation mode.

18. The terminal device according to claim 17, wherein in the operation mode, the controller is further configured to refrain from enabling the operation of the second character image by the terminal device.

19. A method implemented by an information processing device, the method comprising:
controlling display, in a virtual space, of a first character image on a map of a real space, in accordance with a position of a first user in the real space; and
in response to a distance in the virtual space between the first character image and a second character image of a second user being less than or equal to a first distance, entering an operation mode enabling an operation of the first character image by the first user,
wherein the operation of the first character image by the first user comprises an interaction with an interface of the information processing device to move the first character image along streets displayed on the map of the real space, and
wherein in the operation mode, the first character image in the virtual space is movable within a predetermined range that is less than or equal to a second distance away from a position of the first character image before entering the operation mode.

20. A method implemented by a terminal device, the method comprising:
controlling a display, in a virtual space, of the terminal device to display a first character image on a map of a real space, in accordance with a position of the terminal device in the real space; and in response to a distance in the virtual space between the first character image and a second character image corresponding to a second terminal device being less than or equal to a first distance, entering an operation mode enabling an operation of the first character image by the terminal device, wherein the operation of the first character image comprises an interaction with an interface of the terminal device to move the first character image along streets displayed on the map of the real space, and wherein in the operation mode, the first character image in the virtual space is movable within a predetermined range that is less than or equal to a second distance away from a position of the first character image before entering the operation mode.

* * * * *